US010181590B2

(12) United States Patent
Zeiler et al.

(10) Patent No.: US 10,181,590 B2
(45) Date of Patent: Jan. 15, 2019

(54) RECHARGEABLE BATTERY SYSTEM FOR REPLACEMENT OF LEAD-ACID BATTERY

(71) Applicant: Briggs & Stratton Corporation, Wauwatosa, WI (US)

(72) Inventors: Jeffrey M. Zeiler, Wauwatosa, WI (US); Richard J. Gilpatrick, Whitewater, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 14/641,005

(22) Filed: Mar. 6, 2015

(65) Prior Publication Data

US 2015/0318521 A1  Nov. 5, 2015

Related U.S. Application Data

(60) Provisional application No. 61/949,107, filed on Mar. 6, 2014.

(51) Int. Cl.
*H01M 2/10* (2006.01)
*H01M 10/0525* (2010.01)
(Continued)

(52) U.S. Cl.
CPC ......... *H01M 2/1016* (2013.01); *H01M 2/043* (2013.01); *H01M 2/1072* (2013.01);
(Continued)

(58) Field of Classification Search
CPC ............. H01M 10/0525; H01M 2/043; H01M 10/052; H01M 2/1016; H01M 2/1072; H01M 2220/20; H02J 7/0045
(Continued)

(56) References Cited

U.S. PATENT DOCUMENTS 3,888,325 A   6/1975 Reinbeck
D252,354 S    7/1979 Uyeda
(Continued)

FOREIGN PATENT DOCUMENTS

CN   101682197 A   3/2010
CN   102064349 A   5/2011
(Continued)

OTHER PUBLICATIONS

International Search Report and Written Opinion for PCT/US2015/019205, dated Jun. 1, 2015, 8 pages.
(Continued)

*Primary Examiner* — Cynthia H Kelly
*Assistant Examiner* — Omar M Kekia
(74) *Attorney, Agent, or Firm* — Foley & Lardner LLP

(57) ABSTRACT

A battery system for use with outdoor power equipment includes a base including a positive terminal, a negative terminal, and a battery receptacle electrically coupled to the positive terminal and the negative terminal, wherein the positive terminal and the negative terminal are spaced apart by a distance substantially the same as a standard distance between terminals of a standard lead-acid battery, and a lithium-ion battery removably attached to the battery receptacle, wherein when attached, the lithium-ion battery is electrically coupled to the positive terminal and the negative terminal via the battery receptacle.

19 Claims, 20 Drawing Sheets

(51) Int. Cl.
*H01M 2/04* (2006.01)
*H02J 7/00* (2006.01)
*H01M 10/052* (2010.01)

(52) U.S. Cl.
CPC ....... *H01M 10/0525* (2013.01); *H02J 7/0045* (2013.01); *H01M 10/052* (2013.01); *H01M 2220/20* (2013.01)

(58) Field of Classification Search
USPC ............................... 320/107; 429/65, 96, 99
See application file for complete search history.

(56) References Cited

U.S. PATENT DOCUMENTS

| | | |
|---|---|---|
| 4,806,440 A | 2/1989 | Hahs et al. |
| 4,870,811 A | 10/1989 | Steele |
| 4,882,896 A | 11/1989 | Wilcox |
| 5,085,043 A | 2/1992 | Hess et al. |
| 5,186,142 A | 2/1993 | Brunelli et al. |
| 5,208,525 A | 5/1993 | Lopic et al. |
| 5,406,778 A | 4/1995 | Lamb et al. |
| 5,442,901 A | 8/1995 | Niemela et al. |
| 5,512,065 A | 4/1996 | Kump et al. |
| 5,606,851 A | 3/1997 | Bruener et al. |
| 5,784,868 A | 7/1998 | Wadzinski et al. |
| 5,906,088 A | 5/1999 | Inui et al. |
| 5,910,091 A | 6/1999 | Iida et al. |
| RE36,250 E | 7/1999 | Hess et al. |
| 5,934,053 A | 8/1999 | Fillman et al. |
| 5,937,623 A | 8/1999 | Wolf |
| 6,001,506 A | 12/1999 | Timmons et al. |
| 6,077,186 A | 6/2000 | Kojima et al. |
| 6,078,015 A | 6/2000 | Martinez |
| 6,160,373 A | 12/2000 | Dunn et al. |
| 6,220,005 B1 | 4/2001 | Plamper et al. |
| 6,230,678 B1 | 5/2001 | Gracyalny et al. |
| 6,260,529 B1 | 7/2001 | Gracyalny et al. |
| 6,263,852 B1 | 7/2001 | Gracyalny et al. |
| 6,311,663 B2 | 11/2001 | Gracyalny et al. |
| 6,325,036 B1 | 12/2001 | Gracyalny et al. |
| 6,386,169 B1 | 5/2002 | Gracyalny et al. |
| 6,404,078 B1 | 6/2002 | Thomas et al. |
| 6,464,052 B1 | 10/2002 | Hsiao |
| 6,521,371 B1 | 2/2003 | Lavanture |
| 6,523,334 B1 | 2/2003 | Dettmann |
| 6,571,542 B1 | 6/2003 | Fillman et al. |
| 6,595,176 B2 | 7/2003 | Poehlman et al. |
| 6,615,787 B2 | 9/2003 | Gracyalny |
| 6,622,683 B2 | 9/2003 | Gracyalny et al. |
| 6,647,942 B2 | 11/2003 | Poehlman et al. |
| 6,666,008 B2 | 12/2003 | Iida et al. |
| D491,138 S | 6/2004 | Minato |
| 6,751,936 B2 | 6/2004 | Kucera et al. |
| 6,758,030 B2 | 7/2004 | Dettmann |
| 6,826,895 B2 | 12/2004 | Iida et al. |
| D517,987 S | 3/2006 | Castagnola et al. |
| 7,007,446 B2 | 3/2006 | Dettmann |
| 7,128,037 B2 | 10/2006 | Tumback et al. |
| 7,180,200 B2 | 2/2007 | Walter et al. |
| 7,309,928 B2 | 12/2007 | Grant et al. |
| 7,434,642 B2 | 10/2008 | Dettmann |
| 7,479,754 B2 | 1/2009 | Lucas et al. |
| 7,525,287 B2 | 4/2009 | Miyashita et al. |
| D592,134 S | 5/2009 | Brockington |
| 7,540,132 B2 | 6/2009 | Shimada et al. |
| D610,083 S | 2/2010 | Chen et al. |
| 7,677,017 B2 | 3/2010 | Holby |
| 7,687,926 B2 | 3/2010 | Grant et al. |
| 7,728,534 B2 | 6/2010 | Lucas et al. |
| 7,782,626 B2 | 8/2010 | Buck et al. |
| 7,989,969 B2 | 8/2011 | Grant et al. |
| 8,425,203 B2 | 4/2013 | Gardner et al. |
| 8,485,796 B2 | 7/2013 | Gilpatrick |
| D730,300 S | 5/2015 | Kobayashi et al. |
| D751,513 S | 3/2016 | Kobayashi et al. |
| 2004/0012204 A1 | 1/2004 | Walter et al. |
| 2004/0191615 A1* | 9/2004 | Johnson ............ H01M 2/1072 429/121 |
| 2004/0257038 A1 | 12/2004 | Johnson et al. |
| 2006/0027253 A1 | 2/2006 | Kaiser |
| 2006/0245941 A1 | 11/2006 | Sharp |
| 2007/0001680 A1* | 1/2007 | Khoo ................. G01R 31/3655 324/430 |
| 2007/0240892 A1 | 10/2007 | Brotto et al. |
| 2008/0025010 A1* | 1/2008 | Zick ................... H01M 2/1022 361/807 |
| 2008/0120955 A1 | 5/2008 | Lucas et al. |
| 2008/0223012 A1 | 9/2008 | Rosa et al. |
| 2008/0238361 A1* | 10/2008 | Pinnell .................. H02J 7/045 320/107 |
| 2008/0289309 A1 | 11/2008 | Gust et al. |
| 2009/0064957 A1 | 3/2009 | Grybush |
| 2009/0223475 A1 | 9/2009 | Wilson et al. |
| 2009/0255502 A1 | 10/2009 | Cook |
| 2009/0278509 A1 | 11/2009 | Boyles et al. |
| 2009/0284022 A1 | 11/2009 | Usselman et al. |
| 2010/0310905 A1 | 12/2010 | Oriet et al. |
| 2010/0316895 A1* | 12/2010 | Hedrich ............. H01M 2/1077 429/83 |
| 2012/0208050 A1* | 8/2012 | Chen ................... H01M 2/1077 429/7 |
| 2012/0235473 A1* | 9/2012 | Jiang ................... H01M 2/1072 307/9.1 |
| 2012/0315532 A1* | 12/2012 | Andersen ................ H01M 2/20 429/175 |
| 2013/0092745 A1 | 4/2013 | Karp |
| 2013/0111864 A1 | 5/2013 | Hansen et al. |
| 2013/0309534 A1* | 11/2013 | Suzuki ............... H01M 2/0217 429/94 |
| 2015/0171479 A1 | 6/2015 | Fujita |
| 2015/0318521 A1 | 11/2015 | Zeiler et al. |
| 2017/0084886 A1 | 3/2017 | Tononishi |

FOREIGN PATENT DOCUMENTS

| | | |
|---|---|---|
| CN | 103329312 A | 9/2013 |
| CN | 103534135 A | 1/2014 |
| EP | 2 332 768 | 6/2011 |
| EP | 2 506 341 | 10/2012 |
| GB | 2 442 345 | 4/2008 |
| JP | 2006-263628 | 10/2006 |

OTHER PUBLICATIONS

"Ryobi TouchStart Straight Shaft String Trimmer", http://www.youtube.com/watch?feature=endscreen&NR=1&v=qgpCdihrss0, uploaded to YouTube Apr. 27, 2011, 1 page.
"Ryobi® TouchStart", http://www.youtube.com/watch?v=BpyOxL9IG88&noredirect=1, uploaded to YouTube Feb. 24, 2010, 1 page.
"How to Start Ryobi Touch Start™ Petrol Line Trimmer and Brush Cutter," http://www.youtube.com/watch?v=tjAtHunBemM&feature=related, uploaded to YouTube Dec. 9, 2011, 1 page.
Briggs & Stratton Service and Repair Instructions for Single Cylinder 4-Cycle Engines, Section 7B, Electric Starter Systems, Jan. 1990, 8 pages.
International Search Report and Written Opinion for PCT Application No. PCT/US2014/043232, dated Sep. 30, 2014, 9 pages.
International Search Report and Written Opinion regarding PCT/US2013/035623, dated Sep. 10, 2013, 19 pages.
Machine Translation of JP2006263628A, dated Oct. 5, 2006, 4 pages.

* cited by examiner

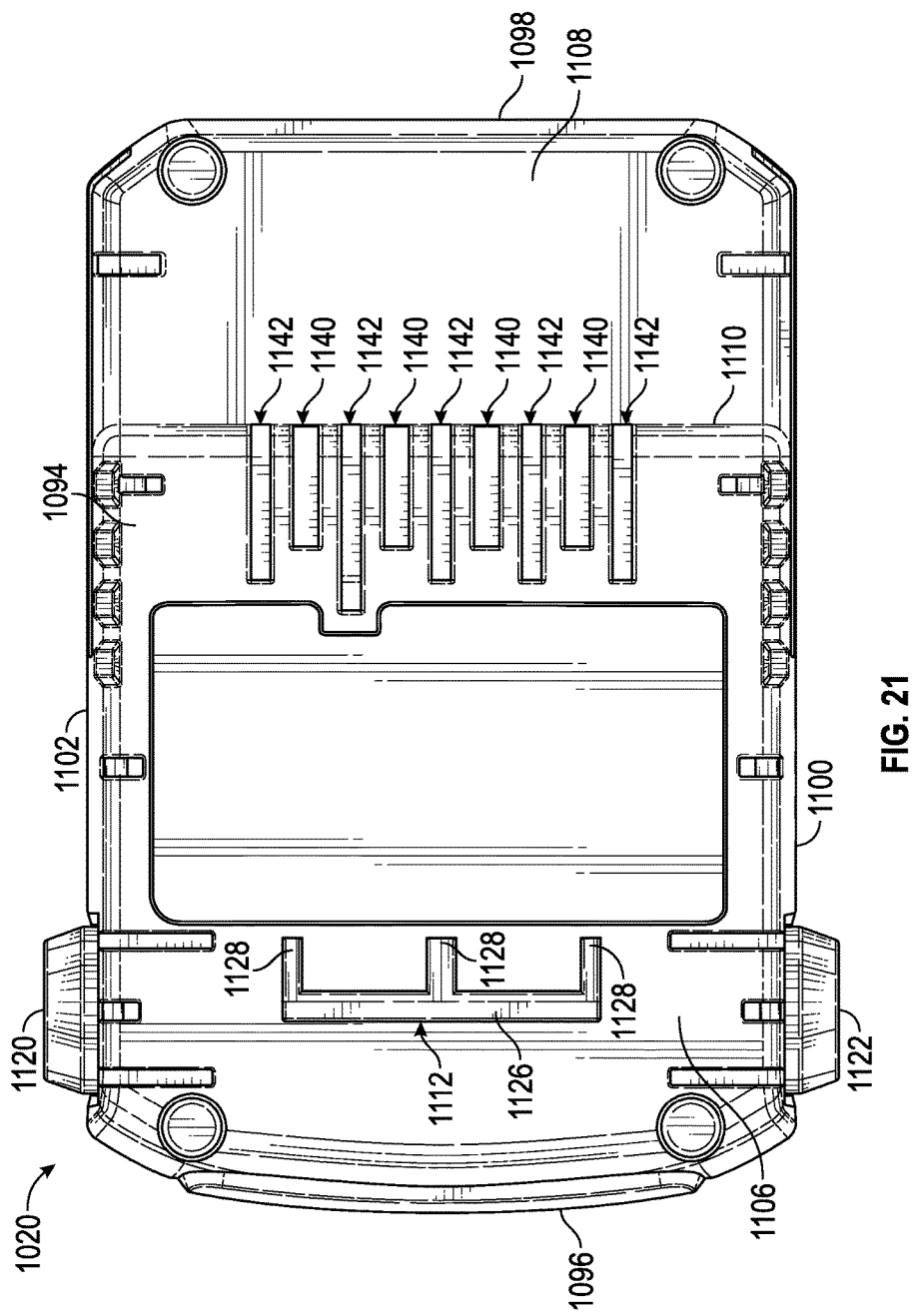

RECHARGEABLE BATTERY SYSTEM FOR REPLACEMENT OF LEAD-ACID BATTERY

CROSS-REFERENCE TO RELATED PATENT APPLICATIONS

This application claims the benefit of U.S. Application No. 61/949,107, filed Mar. 6, 2014, which is incorporated herein by reference in its entirety.

BACKGROUND

The present invention relates generally to the field of battery systems and, in some embodiments, to battery systems for outdoor power equipment. Outdoor power equipment includes lawn mowers, riding tractors, snow throwers, pressure washers, portable generators, tillers, log splitters, zero-turn radius mowers, walk-behind mowers, riding mowers, industrial vehicles such as forklifts, utility vehicles, etc. Outdoor power equipment may, for example, use an internal combustion engine to drive an implement, such as a rotary blade of a lawn mower, a pump of a pressure washer, the auger of a snowthrower, the alternator of a generator, and/or a drivetrain of the outdoor power equipment. Vehicles include cars, trucks, automobiles, motorcycles, scooters, boats, all-terrain vehicles (ATVs), personal water craft, snowmobiles, utility vehicles (UTVs), and the like. Outdoor power equipment, vehicles, engine driven equipment, engines and other engine related applications are collectively referred to as "equipment."

Equipment may include an electric starting system in which a starter motor powered by a battery starts the engine. Typically, such electric starting systems also include a user-actuated starter switch (e.g., a pushbutton or key switch) and a starter solenoid. The starter solenoid is the connection between a low current circuit including the starter switch and a high current circuit including the starter motor. To start the engine, the user actuates the starter switch, causing the starter solenoid to close so that the battery provides starting current to the starting motor to start the engine.

A conventional battery system may include a lead-acid battery. The rated voltage and discharge capacity of the lead-acid battery can vary. Typically, the rated voltage for a lead-acid battery used in outdoor power equipment is between 6 volts and 12 volts. Lead-acid batteries are filled with a liquid electrolyte, typically a mixture of water and sulfuric acid. The electrolyte is corrosive. Lead-acid batteries are temperature sensitive, which may result in the engine having difficulty starting or not starting at all in cold weather. Also, a lead-acid battery will degrade over periods of non-use and will gradually lose the ability to provide adequate voltage (i.e., lose charge or become completely discharged—lead acid batteries may lose approximately 1 percent of charge capacity per day of non-use). A lead-acid battery may need to be replaced seasonally, removed from the outdoor power equipment and stored inside, or otherwise maintained or serviced by a user. Infrequent/intermittent use further exacerbates problems inherent to lead-acid batteries. Certain applications (such as outdoor power equipment) that are subjected to extreme temperatures and/or infrequent/ intermittent use may cause premature failure of lead-acid batteries.

Lead-acid batteries of a particular rated voltage and discharge capacity have substantially standard dimensions for the spacing between the battery terminals, for the placement of the battery terminals (i.e., top or side mounted terminals), for the location of the positive battery terminal (i.e., left front position or right front position with the terminal side of the battery facing the user), for the size of the battery housing (i.e., height, width, and depth of the housing), and for the mounting points or other structures used to secure the battery to the equipment (e.g., flanges, tie-down points, unobstructed locations to accommodate hold downs, etc.). There are industry standard form factors for lead-acid batteries (e.g., U1, U1R, 22F, 22NF, 26, 26R, etc.). This makes lead-acid batteries of a particular rated voltage and discharge capacity readily replaceable because a replacement battery will fit into the provided space and attach to an electrical system (e.g., via electrical leads connected to the battery terminals) and attach to the equipment (e.g., via hold downs securing the battery to a mounting location) in the same manner as the original battery (e.g., using the same electrical leads and hold downs). A "standard" battery is easily replaceable because batteries of the same size, form factor, terminal location, terminal orientation and terminal configuration can be readily purchased from a variety of sources and such standard batteries are able to be installed as a replacement battery in a piece of equipment without having to modify the mounting location of the original battery or make changes to or replace the wiring leads, hold downs or other components associated with the original battery in order for the replacement battery to make use of the mounting location, wiring leads, hold downs or other components associated with the original battery. For example, the following types of 12 volt batteries are among those considered to be standard for outdoor power equipment: 7U1L, 8U1L, 10U1L, 11U1L, 558MF, and 651MF. Each of these examples and other conventional lead-acid batteries have standard dimensions including a "standard distance between terminals" (center-to-center), a "standard height," a "standard width," a "standard depth," and a "standard cross-sectional area" or footprint (width times depth) that are well-known to those skilled in the arts of batteries and/or outdoor power equipment. For example, for 7U1L, 8U1L, 10U1L, and 11U1L lead-acid batteries, the standard height is 7¼ inches (184 mm), the standard width is 7¾ inches (197 mm), and the standard depth is 5⅛ inches (130 mm). A distance or area is "substantially the same" as one of the standard distances or areas of a standard lead-acid battery when such a distance or area allows a battery or other component having such a distance or area to be readily used in place of the standard lead-acid battery. In some embodiments of the present invention, plus or minus 25% of the distance or area is the outer limit for a distance or area to be considered "substantially the same" as one of the standard distances or areas. In some embodiments of the present invention, plus or minus 20% of the distance or area is the outer limit for a distance or area to be considered "substantially the same" as one of the standard distances or areas. In some embodiments of the present invention, plus or minus 15% of the distance or area is the outer limit for a distance or area to be considered "substantially the same" as one of the standard distances or areas. In some embodiments of the present invention, plus or minus 10% of the distance or area is the outer limit for a distance or area to be considered "substantially the same" as one of the standard distances or areas. In some embodiments of the present invention, plus or minus 5% of the distance or area is the outer limit for a distance or area to be considered "substantially the same" as one of the standard distances or areas. In some embodiments of the present invention, a distance or area the same as one of the standard distances or areas is considered to be "substantially the same" as one of the standard distances or areas.

SUMMARY

One embodiment of the invention relates to a battery system for use with outdoor power equipment including a base including a positive terminal, a negative terminal, and a battery receptacle electrically coupled to the positive terminal and the negative terminal, wherein the positive terminal and the negative terminal are spaced apart by a distance substantially the same as a standard distance between terminals of a standard lead-acid battery, and a lithium-ion battery removably attached to the battery receptacle, wherein when attached, the lithium-ion battery is electrically coupled to the positive terminal and the negative terminal via the battery receptacle.

Another embodiment of the invention relates to a battery system including a base including a positive terminal, a negative terminal, wherein the base is configured to replace a standard lead-acid battery, and a rechargeable battery removably attached to the base, wherein when attached, the rechargeable battery is electrically coupled to the positive terminal and the negative terminal.

Another embodiment of the invention relates to a battery base including a housing including a battery receptacle configured to receive a removable rechargeable battery, wherein the housing is configured to replace a standard lead-acid battery, a positive terminal, and a negative terminal, wherein the battery receptacle is electrically coupled to the positive terminal and the negative terminal.

Another embodiment of the invention relates to a battery base for use with outdoor power equipment including a housing having a battery receptacle configured to receive a removable rechargeable battery, a positive terminal, and a negative terminal. The battery receptacle is electrically coupled to the positive terminal and the negative terminal. The positive terminal and the negative terminal are spaced apart by a distance substantially the same as a standard distance between terminals of a standard lead-acid battery.

Alternative exemplary embodiments relate to other features and combinations of features as may be generally recited in the claims.

BRIEF DESCRIPTION OF THE FIGURES

The invention will become more fully understood from the following detailed description, taken in conjunction with the accompanying drawings, in which:

FIG. 21 is a bottom view of the battery of FIG. 20.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
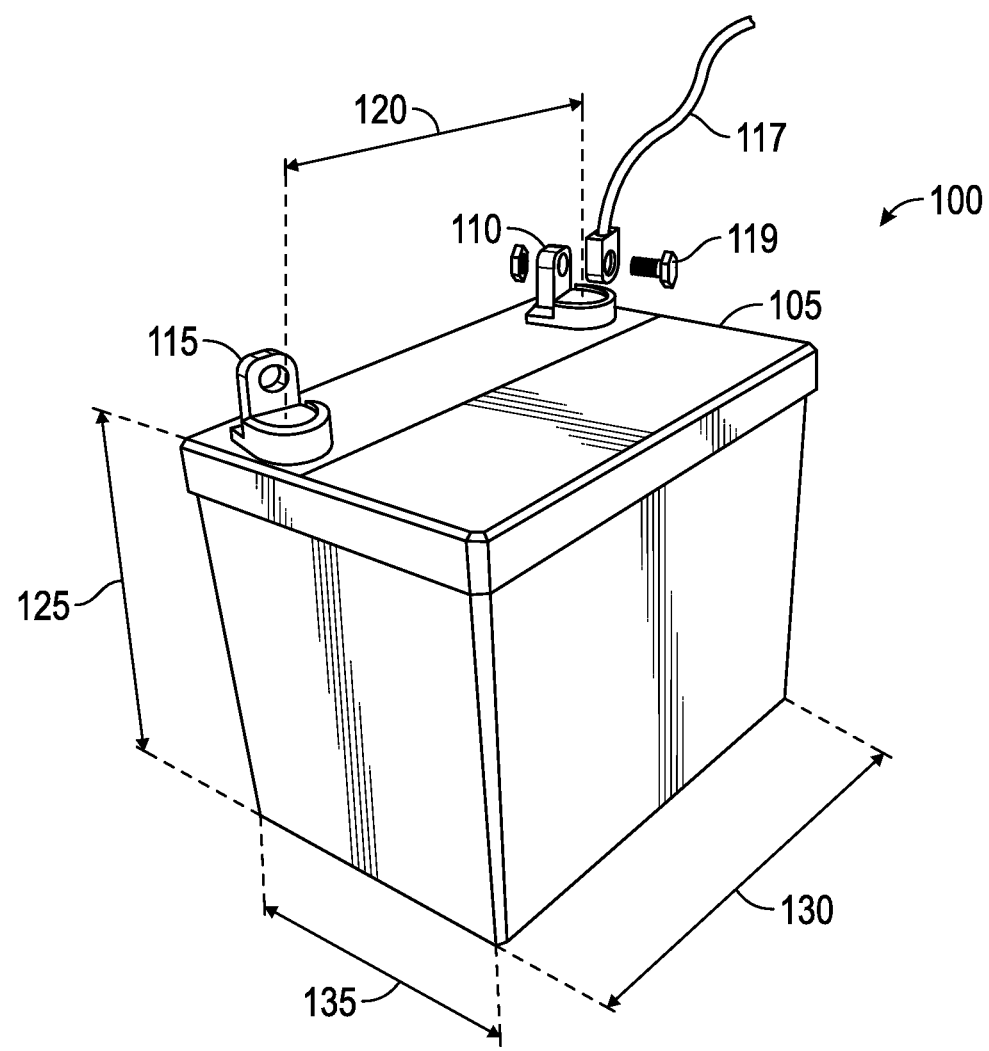
FIG. 1 is a perspective view of a standard lead-acid battery.

Referring to FIG. 1, a standard lead-acid battery 100 is illustrated. The battery 100 includes a housing 105, a positive terminal 110, and a negative terminal 115. The terminals 110 and 115 are spaced apart by a standard distance 120 between terminals as measured from the center of the terminal 110 to the center of the terminal 115. For each terminal, an electrical lead 117 and a fastener 119 (e.g., a bolt and nut) are used to electrically connect the terminal to the electrical system powered by the battery (e.g., a starting system of a piece of outdoor power equipment, such as a starter motor that starts an internal combustion engine that powers the equipment). The terminals 110 and 115 are mounted to the top of the housing 105 at a standard height 125. Industry standards exist for the type of terminals used with a standard lead-acid battery. For example, as illustrated in FIG. 1, terminals 110 and 115 are L terminals (LT). Other standard lead-acid battery terminals include SAE terminals, JIS terminals, embedded low profile terminals (ELPT), embedded high profile terminals (EHPT), embedded automotive post terminals (EAPT), automotive post and stud terminals (DT), universal terminals (UT), embedded universal terminals (EUT), automotive post terminals (AP), wingnut terminals (WNT), dual wingnut terminals (DWNT), stud terminals (ST), low profile terminals (LPT), embedded automotive post and stud terminals (DT), M terminals (M), and F terminals (F). The housing 105 has a standard width 130 and a standard depth 135, resulting in the standard footprint for the battery 100. The housing 105 has a standard width 130 and a standard depth 135, resulting a standard footprint for the battery 100.

Standard lead-acid batteries, like battery 100, can be difficult or bothersome for users to replace. Users may discover that the battery for a certain piece of equipment has failed (i.e., has insufficient charge or has otherwise ceased to function as necessary) when attempting to start the outdoor power equipment to perform a task. The user must use tools to remove the failed battery from the equipment (e.g. to disconnect electrical leads connected to the battery terminals, to uninstall one or more battery hold downs, etc.), acquire a new battery, and use tools to install the new battery (e.g. to connect electrical leads to the battery terminals, to install one or more battery hold downs, etc.). The lead-acid battery may be heavy and may be mounted to the equipment in a location that is confined and difficult to access. It can be difficult for the user to access the lead-acid battery and awkward or difficult to move a lead-acid battery out of or into the mounting location on the equipment. Exposure to cold temperatures can reduce lead-acid battery life. Seasonal use (e.g., warm weather use or cold weather use) and sporadic use (e.g., once a week, several uses a month, etc.) can reduce lead-acid battery life. Accordingly, lead-acid battery life may be particularly limited for sporadically and/or seasonally used equipment (e.g., outdoor power equipment including lawn mowers, riding tractors, ZTRs, snow throwers, portable generators, standby generators, marine vehicles including boats and personal water craft, etc., small personal vehicles including motorcycles, snowmobiles, all-terrain vehicles, etc.), with a new battery needed every few years.

Figure 2:
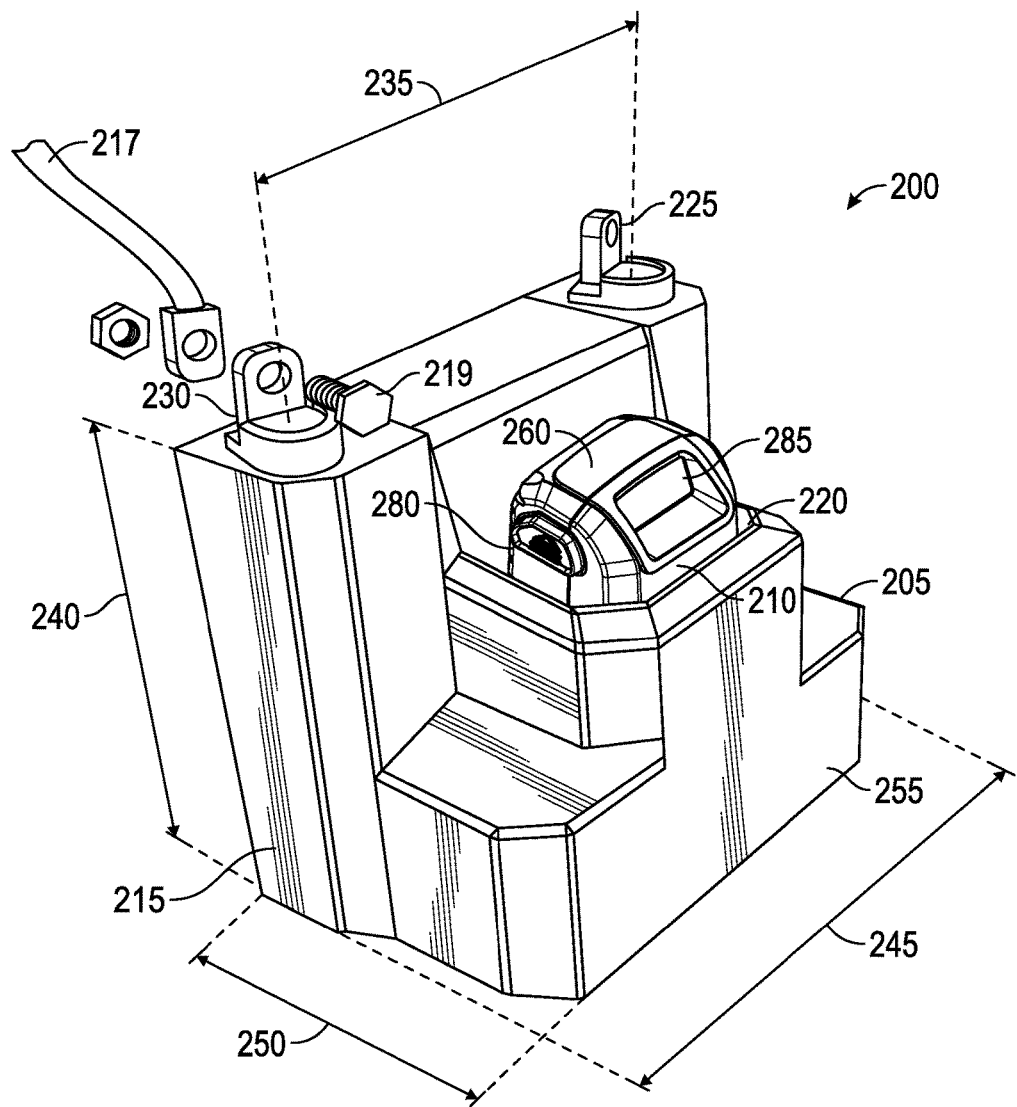
FIG. 2 is a perspective view of a battery system including a base and a rechargeable battery with the battery attached to the base, according to an exemplary embodiment.
Figure 3:
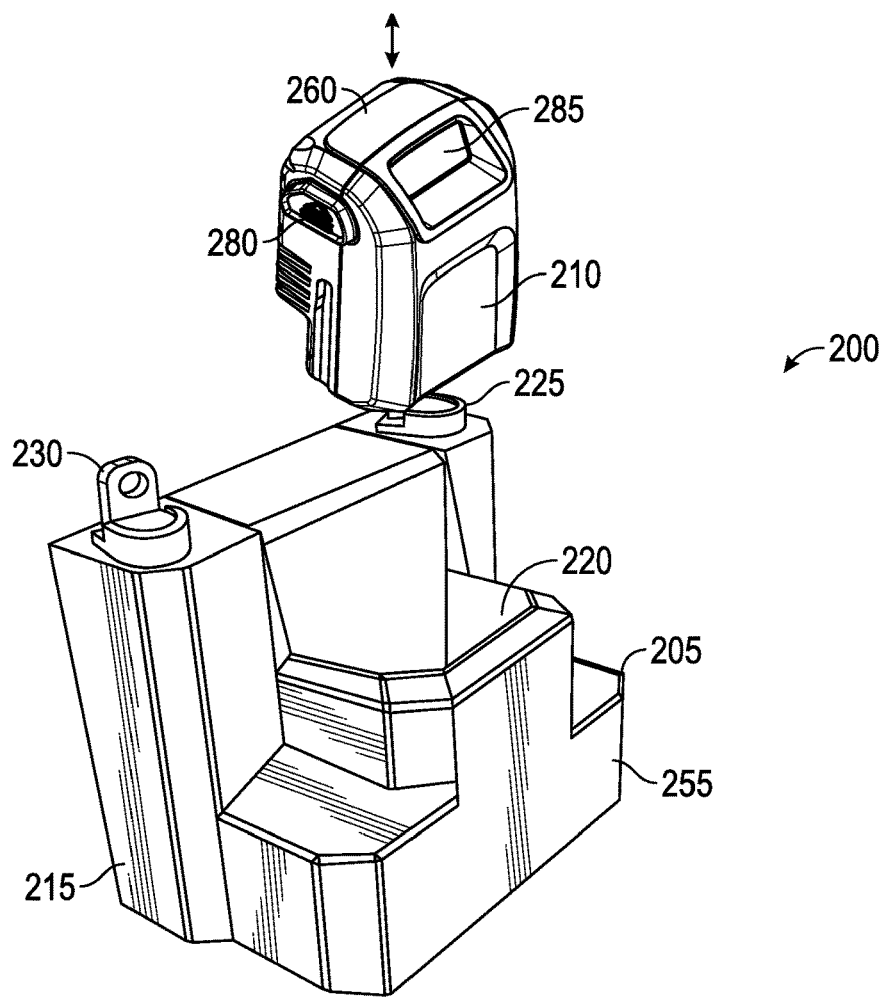
FIG. 3 is a perspective view of the battery system of FIG. 2 with the battery detached from the base.
Figure 3A:
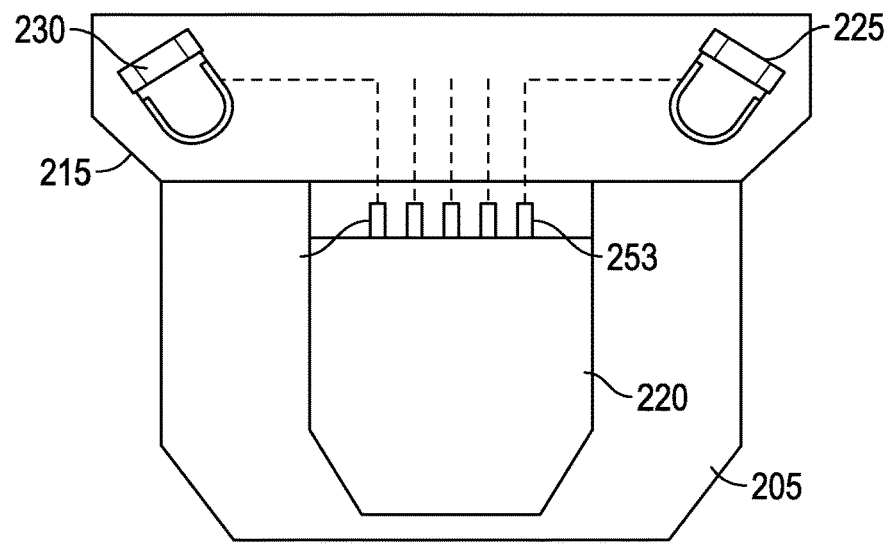
FIG. 3A is a top view of the base of the battery system of FIG. 2.

A battery system 200 is illustrated in FIGS. 2-3A according to an exemplary embodiment. The battery system 200 includes a base 205 (support, housing, shroud, receiver, adapter) and a removable rechargeable battery 210. Preferably, the removable rechargeable battery 210 is a lithium-ion battery. Lithium-ion batteries are rechargeable and typically have a longer life than a comparable lead-acid battery. Lithium-ion batteries are smaller in size and lighter in weight than comparable lead-acid batteries having the same or similar voltage ratings and charge/energy capacities. The battery system 200 replaces a standard lead-acid battery and eliminates many of the shortcomings associated with lead-acid batteries. The rechargeable battery 210 can be removed by the user from the base 205 without the use of tools and recharged, rather than having to be replaced like a failed lead-acid battery. Being able to recharge the battery 210 will typically reduce the amount of time a user needs to replace a failed battery. Rather than removing the failed lead-acid battery with tools, traveling to purchase a new lead-acid battery, and installing the new lead-acid battery with tools, the user can simply remove the rechargeable battery 210 without tools from the base 205, recharge it in a charging station or with a charging connector or plug, and reattach the rechargeable battery 210 to the base 205. In some embodiments, a lithium-ion battery can be recharged in five minutes or less to a level of charge sufficient to start a piece of outdoor power equipment. Or, if the user has a second rechargeable battery having a sufficient charge, there is no need to wait for the first rechargeable battery to recharge, the second rechargeable battery can be attached to the base 205 and the associated equipment used while the first rechargeable battery is recharging. This reduces the amount of user time and effort necessary to change a failed battery and also simplifies the tasks of removing and installing the battery by eliminating the need to use tools. The performance of lead-acid batteries is negatively impacted by the cold. In extreme cold, a lead-acid battery may be unable to start the piece of equipment. However, with the battery system 200, the rechargeable battery 210 can be removed from the base 205 and brought inside to warm up, be recharged if necessary, and then reattached to the base 205 after warming up, making it possible to start the outdoor power equipment even in cold conditions. Also, the user saves money, because the rechargeable battery 210 does not need to be periodically replaced with a new battery as frequently as a lead-acid battery does. The battery system 200 can either be installed as original equipment by the manufacturer of the equipment or installed as an aftermarket replacement for a standard lead-acid battery.

The base 205 includes a housing 215, a battery receptacle 220, a positive terminal 225, and a negative terminal 230. The battery receptacle 220 is configured to receive and attach the rechargeable battery 210 to the base 205. The battery receptacle 220 may be a port, socket, pocket, sleeve, or other appropriate interface or structure for attaching the battery 210 to the base 205. As illustrated in FIGS. 2-3A, the terminals 225 and 230 are mounted on the top of the housing 215, though in alternative embodiments, the terminals can be mounted on a side of the housing. The terminals 225 and 230 are standard lead-acid battery terminals so that the same electrical leads used to electrically connect the positive terminal and the negative terminal of the original standard lead-acid battery to the piece of equipment are also used to electrically connect the positive terminal 225 and the negative terminal 230 of the base 205 to the piece of equipment. The positive terminal 225 and the negative terminal 230 are spaced apart by a distance 235 substantially the same as the standard distance 120 between terminals of a standard lead-acid battery. The terminals 225 and 230 are positioned at a vertical height 240 substantially the same as the standard height 125 of terminals of a standard lead-acid battery. Alternatively, the positive terminal 225 and the negative terminal 230 are positioned so that the same electrical leads used to electrically connect the positive terminal and the negative terminal of the original standard lead-acid battery to the piece of equipment are also used to electrically connect the positive terminal 225 and the negative terminal 230 of the base 205 to the piece of equipment. This allows the terminals 225 and 230 of the base 205 to be connected to the leads 217 (e.g., by fastener 219) or other connection points that would typically be provided to electrically couple a lead-acid battery to an electrical system of the piece of equipment (e.g., to a starter motor, to a starting system or other electrical system, etc.). The terminals 225 and 230 of the base 205 are positioned so that the same electrical leads used to electrically connect the positive terminal and the negative terminal of the original standard lead-acid battery (i.e., the lead-acid battery originally installed in the piece of equipment) are also used to electrically connect the positive terminal 225 and the negative terminal 230 of the base 205 to the piece of equipment. This eliminates any potential need for a user replacing the original standard lead-acid battery with the battery system 200 to modify (e.g., splice, extend, etc.) or replace the electrical leads of the piece of equipment. The housing 215 has a width 245 (e.g. a maximum width) and a depth 250 (e.g., a maximum depth) so that the base 205 fits within the standard footprint of a standard lead-acid battery, that is the maximum cross-sectional area (i.e. width times depth) of the housing 215 is substantially the same as or less than the standard footprint, and the housing 215 has a height that in some embodiments is the substantially the same as the standard height of a standard lead-acid battery and in other embodiments is less than the standard height of a standard lead-acid battery. This allows the base 205 to be positioned in same location on the equipment as the standard lead-acid battery. There is no need to modify the equipment to use the battery system 200 in place of a standard lead acid battery (e.g., retrofit or rearrange mounting surfaces, mounting points, or other mounting hardware, change wiring harness routings or locations, provide a larger footprint or volume, use different hold downs or mounting structures to secure the base to the mounting location of the equipment, etc.).

Figure 2A:
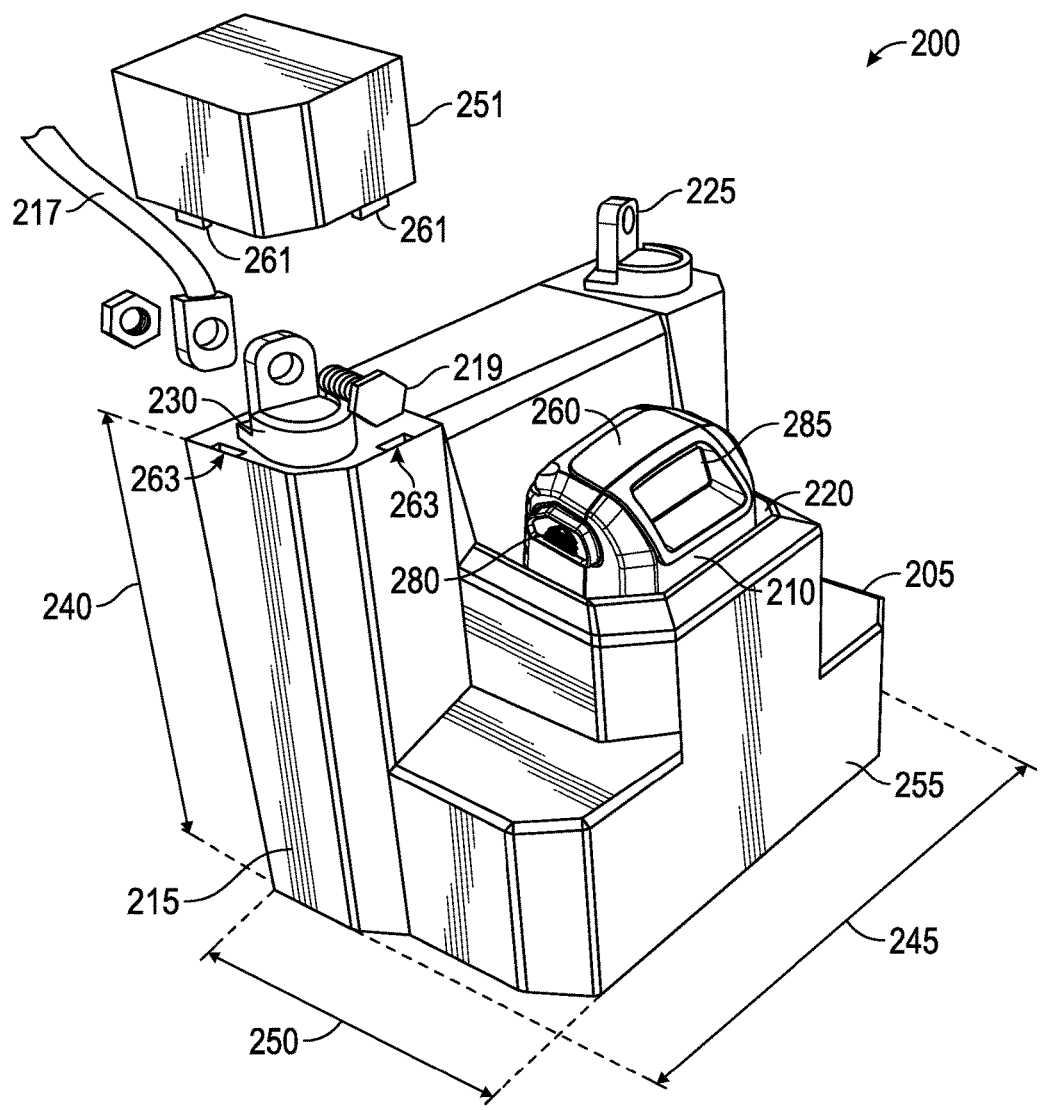
FIG. 2A is a perspective view of the battery system of FIG. 2 with a terminal cover and electrical lead detached from the base.
Figure 2B:
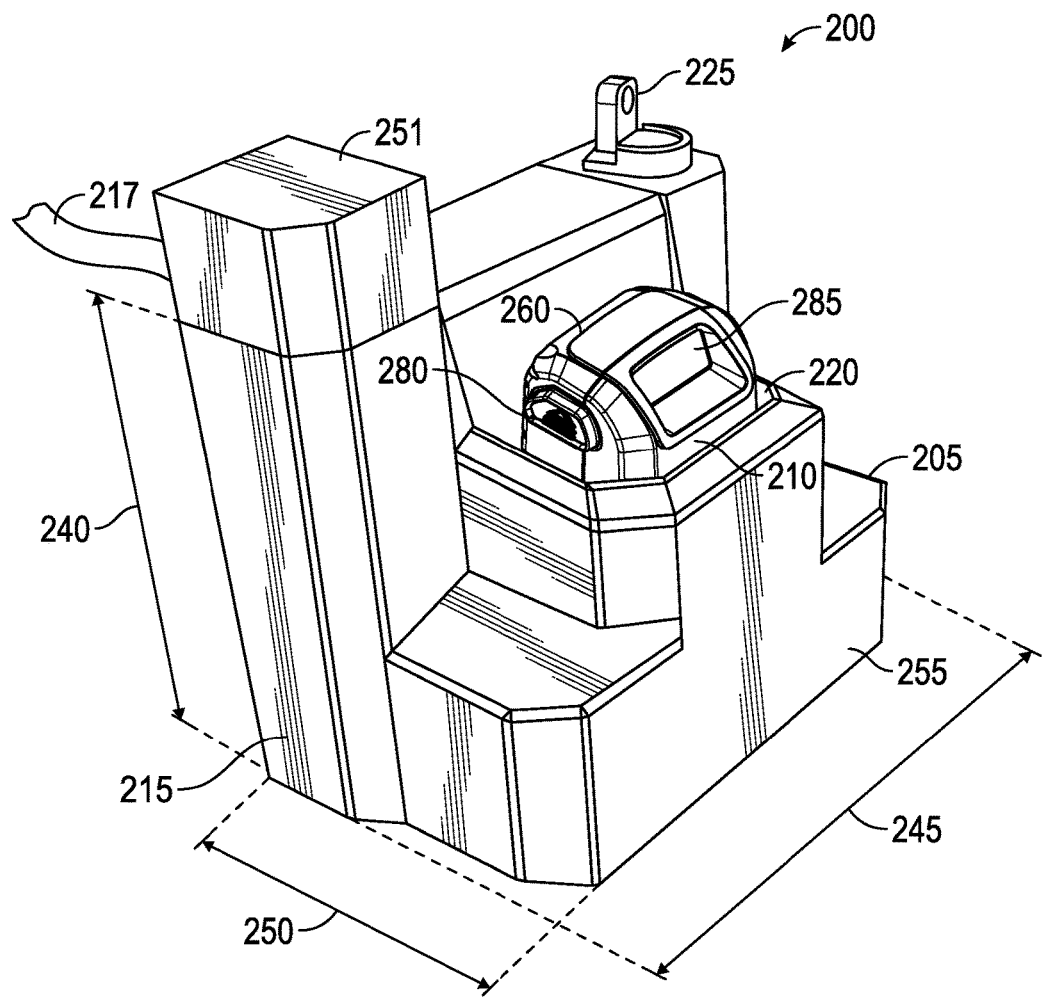
FIG. 2B is a perspective view of the battery system of FIG. 2 with the terminal cover and electrical lead attached to the base.

Referring to FIGS. 2A-2B, the battery system 200 may include one or more covers 251 for limiting access to the positive terminal 225 and/or the negative terminal 230. In some embodiments, the cover 251 protects the positive terminal 225. In some embodiments, the cover 251 protects the negative terminal 230. In some embodiments, two covers are provided with an individual cover 251 protecting each of the terminals 225 and 230. In other embodiments, a single cover is provided with the single cover protecting both terminals 225 and 230. As illustrated in FIGS. 2A-2B, the cover 251 in combination with a portion of the housing 260 encloses the negative terminal 230 to limit user access to the terminal when the cover 251 is attached to the housing 260. The cover 251 includes an opening (not shown) to allow the electrical lead 217 to extend through the cover. A similar cover 251 can be used to protect the positive terminal 225. After the base 205 is installed and the electrical leads 217 have been connected to the positive terminal 225 and the negative terminal 230, it may be desirable to limit user access to the terminals by attaching the cover 251 to the housing 260. The cover removes the terminals from sight and physically limits a user's access to the terminals. Users of equipment powered by lead-acid batteries are frequently familiar with jump starting a dead lead-acid battery with a separate power supply (e.g., a car battery, a battery jump starter pack) or trickle charging a lead-acid battery to maintain a charge or charge a dead battery. The cover 251 may prevent a user from attempting to jump start the battery system 200 with a separate power supply or trickle charge the battery system with a separate power supply. Such attempts to jump start the battery system 200 could damage the base 205 or rechargeable battery 210. The cover 251 may be secured to the housing 260 by one or more tabs 261 and corresponding slots 263. As illustrated, the tabs 261 are part of the cover 251 and the slots 263 are formed in the housing 260, though in other embodiments this may be reversed. In some embodiments, the cover 251 is not readily removable from the housing 260 once attached (i.e., not removable without tools, not removable without damaging the cover 251). It is believed that a cover 251 that is not readily removable may discourage a user from attempting to charge the battery system 200 with a separate power supply. In some embodiments the tabs 261 are one-way or single use tabs so that once the cover 251 is secured to the housing 260, the cover 251 cannot be removed without damaging the cover 251 or the tabs 261. In some embodiments, the cover 251 is secured to the housing with one-way, tamper proof, or security fasteners that once installed cannot be removed with typical household tools (e.g., flat or Phillips-head screwdrivers). In some embodiments, the cover 251 or the housing 260 is marked with warning indicia that indicate to the user that the terminals of the base 205 are not to be used to attempt to jump start or otherwise attempt to charge the battery system 200 with a separate power supply.

In some embodiments, the battery 210 may include circuitry or software to protect the battery 210 from overcharging (e.g., an attempted jump start with a separate power supply). The individual battery cells and the combination or pack of battery cells included in a battery have an overcharge voltage threshold. Charging voltages above the individual cell overcharge threshold or pack overcharge threshold may damage the cell or cells. For example, a lithium-ion battery may use lithium cobalt oxide ($LiCoO_2$) or other metal oxides (e.g., $Mn_2O_4$, etc.) for the battery cathode. $LiCoO_2$ battery cells have an overcharge threshold of approximately 4.2 volts per cell. For a three cell battery, the pack has a pack overcharge threshold of approximately 12.6 volts. As another example, a lithium-ion battery may use lithium iron phosphate ($LiFePO_4$) for the battery cathode. $LiFePO_4$ battery cells have an overcharge threshold of approximately 4.0 volts. For a four cell battery, the pack has a pack overcharge threshold of approximately 16 volts. For example, a field-effect transistor (FET) or other appropriate transistor or semiconductor device may be used to prevent overcharging the battery 210 by stopping the flow of current to the battery cells. The FET may be triggered to stop the flow of current to the battery cells in response to the current exceeding an overcurrent threshold, to a voltage exceeding an overvoltage threshold, to a voltage below an undervoltage threshold, to a temperature exceeding an overtemperature threshold, and/or to a temperature below an undertemperature threshold. A second FET or other appropriate transistor or semiconductor device responsive to similar thresholds may be provided to stop the flow of current out of the battery cells.

The battery receptacle 220 receives and attaches the removable rechargeable battery 210 to the base 205. As illustrated by the arrow in FIG. 3, the battery receptacle 220 is configured so that the battery 210 is inserted into the receptacle 220 in a substantially vertical direction and the battery 210 is removed from the receptacle 220 in a substantially vertical direction. In some embodiments, substantially vertical may be considered to be between −45 degrees and +45 degrees from vertical with the base in its normal operating position, in other embodiments substantially vertical may be considered to be between −30 degrees and +30 degrees from vertical, in other embodiments, substantially vertical may be considered to be between −15 degrees and +15 degrees from vertical, in other embodiments substantially vertical may be considered to be between −5 and +5 degrees from vertical, and in other embodiments substantially vertical may be considered to be vertical. Access to the original standard lead-acid battery of a piece of equipment is frequently limited to the vertical direction. The battery, whether in the original installation or in a replacement installation, must be inserted and removed from its mounting location in a substantially vertical direction due to other components of the piece of equipment that obstruct, limit, or otherwise impeded access to the battery mounting location. The configuration of the battery receptacle 220 makes use of this same vertical access path and avoids the same obstructions to ensure that the user can access the removable rechargeable battery 210 as needed. As illustrated, the battery receptacle 220 is open in the vertical direction so that the battery 210 is inserted into and removed from the battery receptacle 220 in a substantially vertical direction. Alternatively, the battery receptacle may arranged so that the removable rechargeable battery may be inserted into and removed from the receptacle in a substantially horizontal direction. In some embodiments, substantially horizontal may be considered to be between −45 degrees and +45 degrees from horizontal with the base in its normal operating position, in other embodiments substantially horizontal may be considered to be between −30 degrees and +30 degrees from horizontal, in other embodiments, substantially horizontal may be considered to be between −15 degrees and +15 degrees from horizontal, in other embodiments substantially horizontal may be considered to be between −5 and +5 degrees from horizontal, and in other embodiments substantially horizontal may be considered to be horizontal. For example, such a horizontal configuration may be used with equipment in which the battery mounting location is most easily accessed in the horizontal direction. As illustrated, the volume of the removable battery 210 is less than the volume of the base 205. The user is able to relatively easily access the removable battery 210 to remove and attach it as needed to the base 205 when the base 205 is attached to a piece of equipment because the access path to and from the removable battery 210 is similar to the access path used to install the base 205. The removable battery 210 is smaller (e.g., a smaller volume) than the base 205 and will therefore avoid any obstructions that the base 205 is also able to avoid. In some embodiments, volume is considered to a maximum volume of the battery or the base (i.e., the product of the maximum width, maximum depth, and maximum height).

Figure 3B:
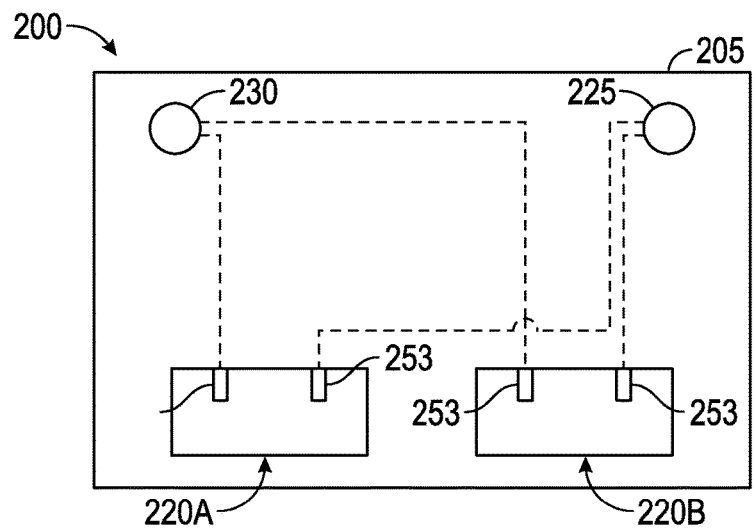
FIG. 3B is a top view of the battery system of FIG. 2 with an alternative base.

As shown in FIG. 3A, the battery receptacle 220 also includes terminals 253 and 254 configured to be electrically coupled to corresponding terminals of the battery 210 when the battery 210 is attached to the battery receptacle 220. At least one of the terminals 253 and 254 is electrically coupled to each of the terminals 225 and 230 to electrically couple the battery receptacle 220 to the terminals 225 and 230 and thereby electrically coupling the attached battery 210 to the terminals 225 and 230 so that power from the battery 210 may be provided to an electrical system of the equipment (e.g., to a starter motor, to a starting system or other electrical system, etc.). Wiring electrically connects a positive terminal 253 of the receptacle 220 to the positive terminal 225 of the base 205. Wiring connects a negative terminal 254 of the receptacle 220 to the negative terminal 230 of the base 205. In some embodiments, one or more additional terminals are provided for making communication, data, or other electronic connections between the battery 210 and the battery receptacle 220, so that communication, date, or other electronic signals can then be passed to or from the battery 210 to appropriate systems or controllers for the engine or equipment associated with the battery system 200. For example, a data terminal may be connected by wiring to the starting system of the engine and provide an enable signal indicating the presence and proper connection of the removable battery 210 to the receptacle 220. The starting system may be configured to not attempt to start the engine if the enable signal is not present. In some embodiments, the terminals 253 and 254 and the related terminals on the battery 210 are not standard lead-acid battery terminals. Rather, the terminals 253 and 254 and the related terminals for the battery are terminals suitable for use with removable batteries (e.g., no tools are needed to make the connection or unmake the connection between terminals). As illustrated in FIGS. 18-21, terminals suitable for use with removable batteries include female terminals 1130, 1132, 1134, and 1136 is formed as a pair of opposed springs that are paired with corresponding male terminals 1024, 1026, and 1028 formed as a blade, spade, prong, or other projection so that the female terminal receives and holds male terminal. In the embodiment illustrated in FIGS. 2-3A, the battery receptacle 220 is located near the front of the base 205 on top of a pedestal 255. This location near the front makes the battery receptacle 220 and removable battery 210 easy to access for a user. FIG. 3B illustrates an alternative embodiment in which the base 205 includes two battery receptacles 220A and 220B. Each battery receptacle includes a positive terminal 253 electrically coupled to the positive terminal 225 of the base 205 (e.g., by wiring). Each battery receptacle also includes a negative terminal 254 electrically coupled to the negative terminal 230 of the base 205 (e.g., by wiring). In some embodiments each battery receptacle may also one or more additional terminals for making communication, date, or other electronic connections as described above with respect to FIG. 3A. The receptacles can be coupled in series with one another to the terminals of the base or can be coupled in parallel with one another to the terminals of the base. In other embodiments, the base 205 can include more than two battery receptacles 220 (e.g., three, four, five, etc.) as needed to provide the power output or capacity needed from a particular battery system. The multiple receptacles can be coupled in series, in parallel, or in combinations of the two to the terminals of the base.

Figure 4:
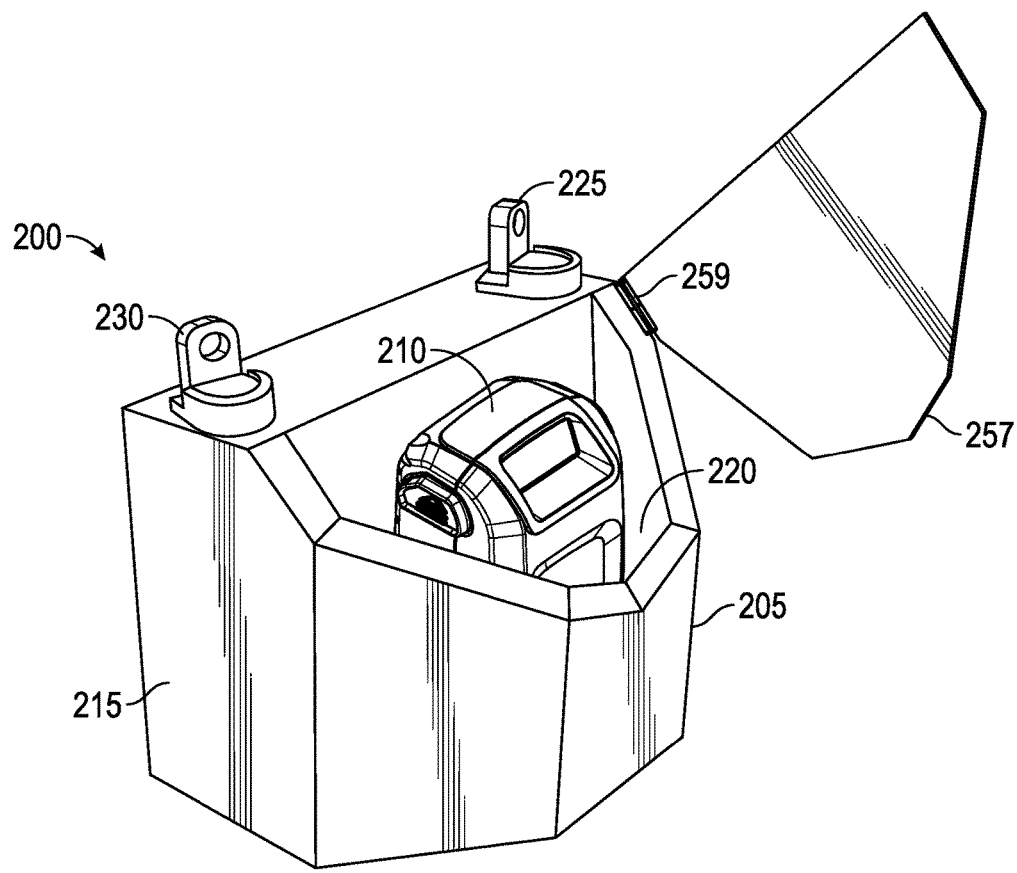
FIG. 4 is a perspective view of the battery system of FIG. 2 with an alternative base.
Figure 5:
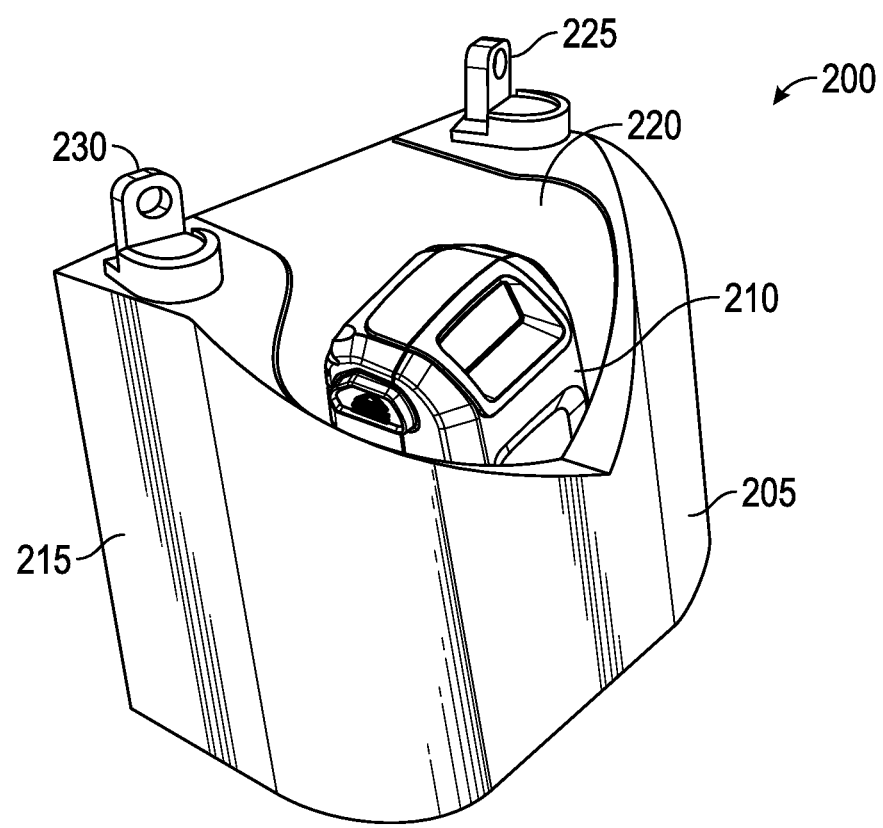
FIG. 5 is a perspective view of the battery system of FIG. 2 with an alternative base.
Figure 6:
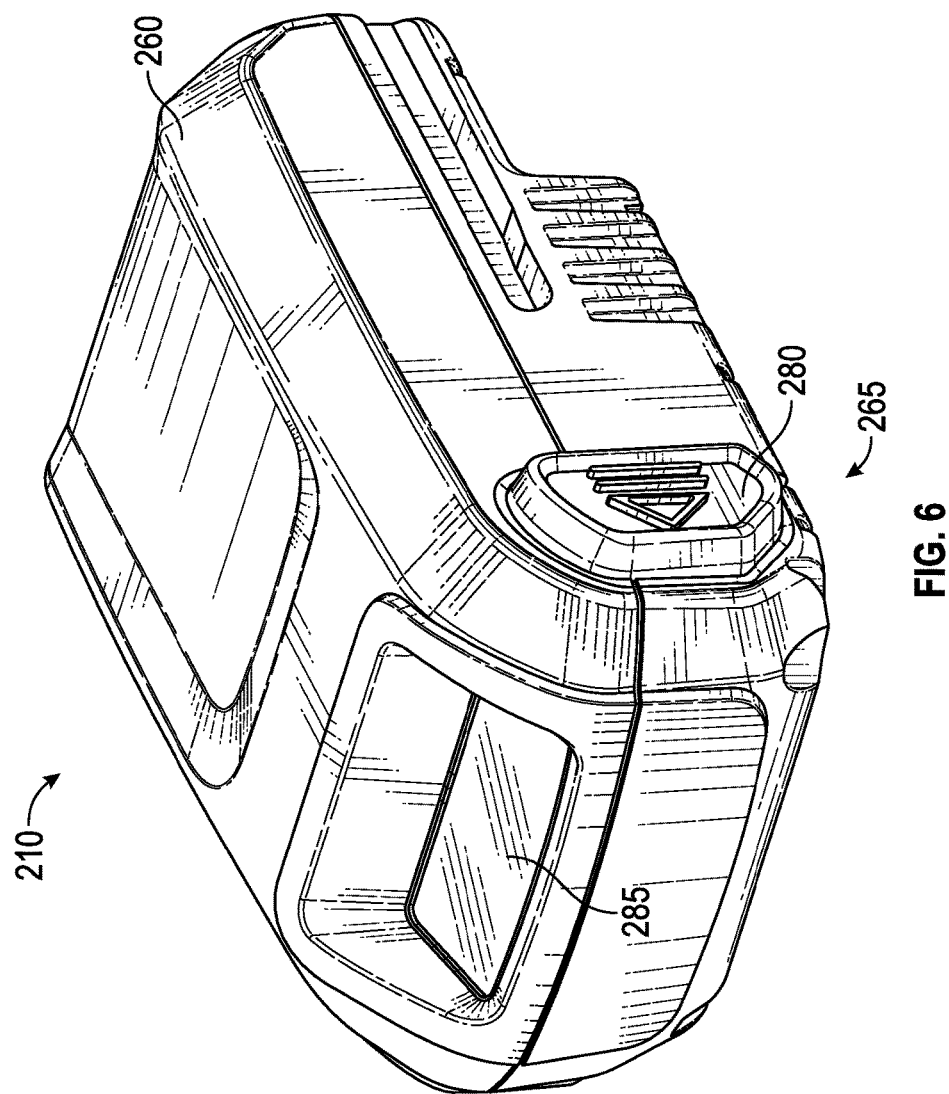
FIG. 6 is a perspective view from above of the battery of FIG. 2.
Figure 7:
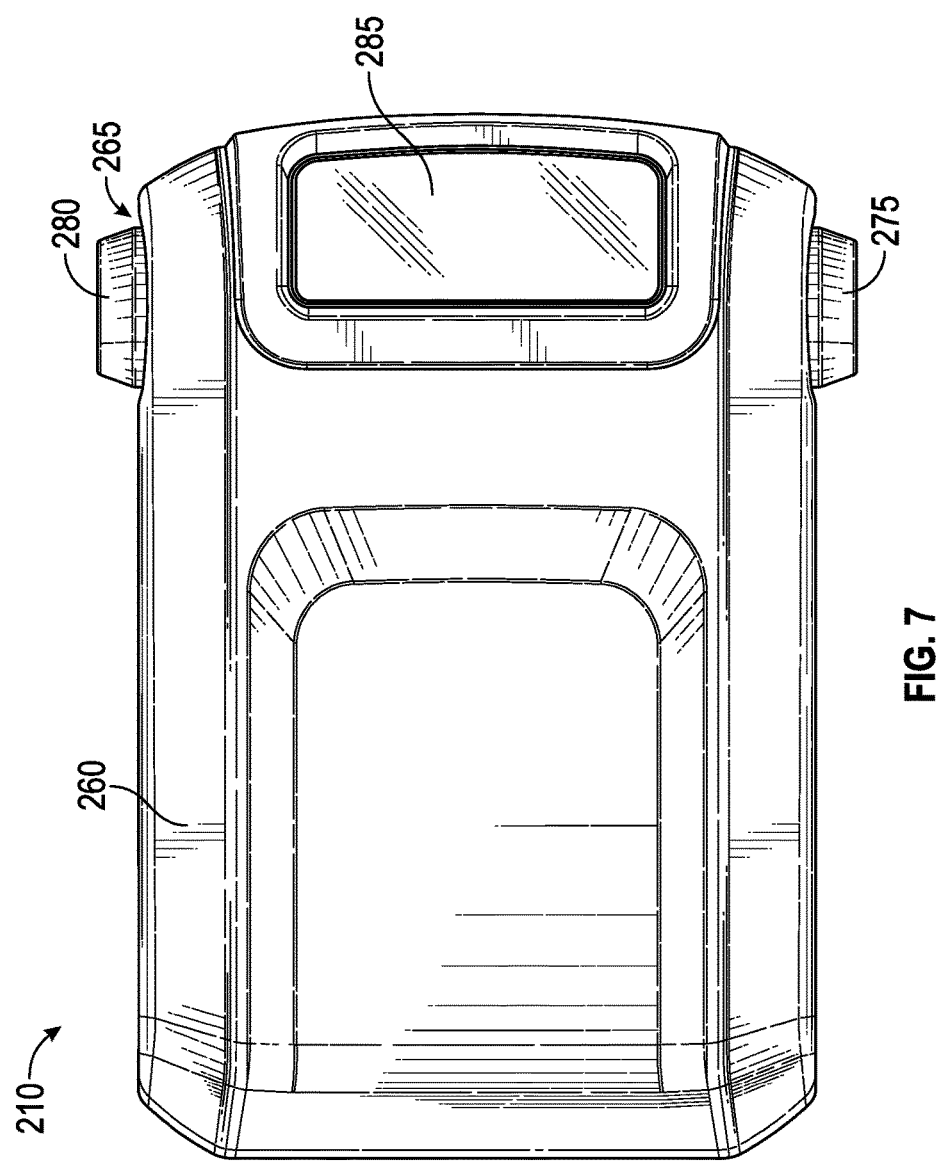
FIG. 7 is a top view of the battery of FIG. 2.

Alternative embodiments of the base 205 are illustrated in FIGS. 4-5. As shown in FIG. 4, in some embodiments, a cover 257 is provided for the battery receptacle 220 to protect the battery receptacle 220 and the removable battery 210 from the elements. The cover 257 may be removable from the base 205 or pivotably, slidably, or otherwise coupled to the base 205 (e.g., by hinge 259) to provide selective access to the battery receptacle 220. The shape and appearance of the base 205 may vary. In some embodiments, the cover 247 may be locked to prevent unwanted access to the removable battery 210.

The removable rechargeable battery 210 is illustrated in FIGS. 6-10 according to an exemplary embodiment. The battery 210 includes a housing 260 and one or more rechargeable battery cells (not shown) (e.g. lithium-ion, lithium-ion polymer, nickel-metal hydride, nickel cadmium, or other rechargeable battery chemistry). The housing 260 may be a sealed enclosure that is configured to protect the electrochemical cells by preventing environmental contaminants (e.g., moisture, plant debris, salt, dust, etc.) from passing into the interior of the battery 210. The housing 260 provides a rugged structure that is able to withstand impact during operation of the outdoor power equipment. The housing 260 may be formed from a material that is resistant to liquid or vaporized fuel (e.g., polyethylene terephthalate or PET) to prevent fuel from passing into the interior of the battery 210. In an alternative embodiment, a liquid resistant cover or lid may be provided to cover the battery 210. The cover may also cover some space surrounding the battery 210. The cover or lid may be movable (e.g., hinged) or removable.

Figure 8:
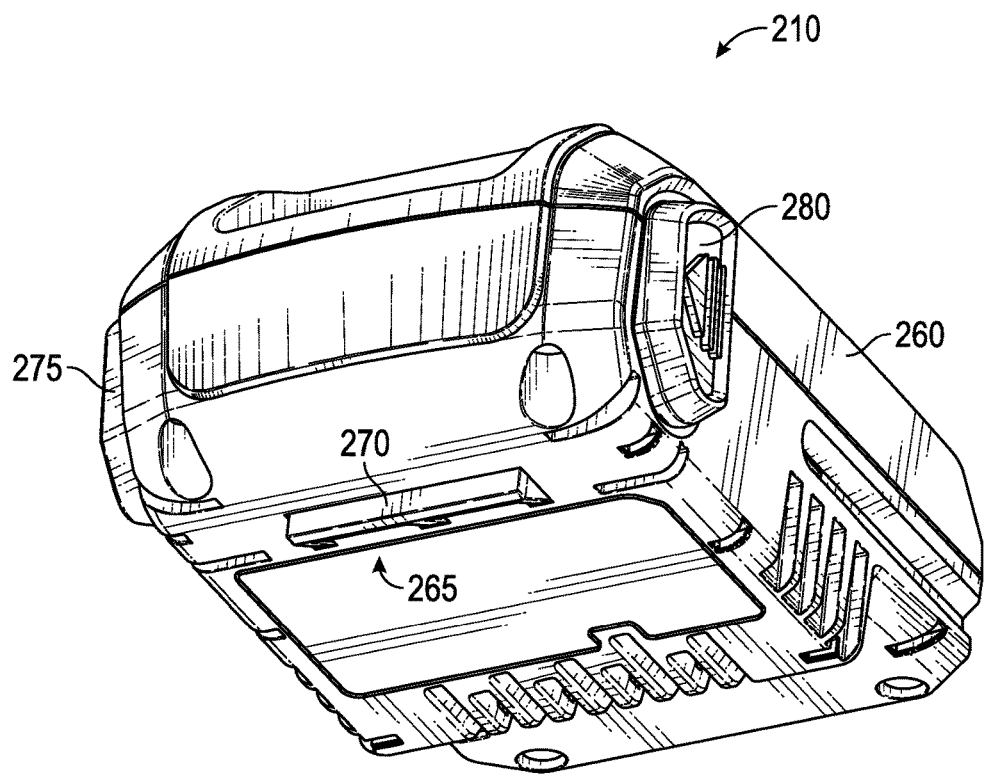
FIG. 8 is a perspective view from below of the battery of FIG. 2.
Figure 9:
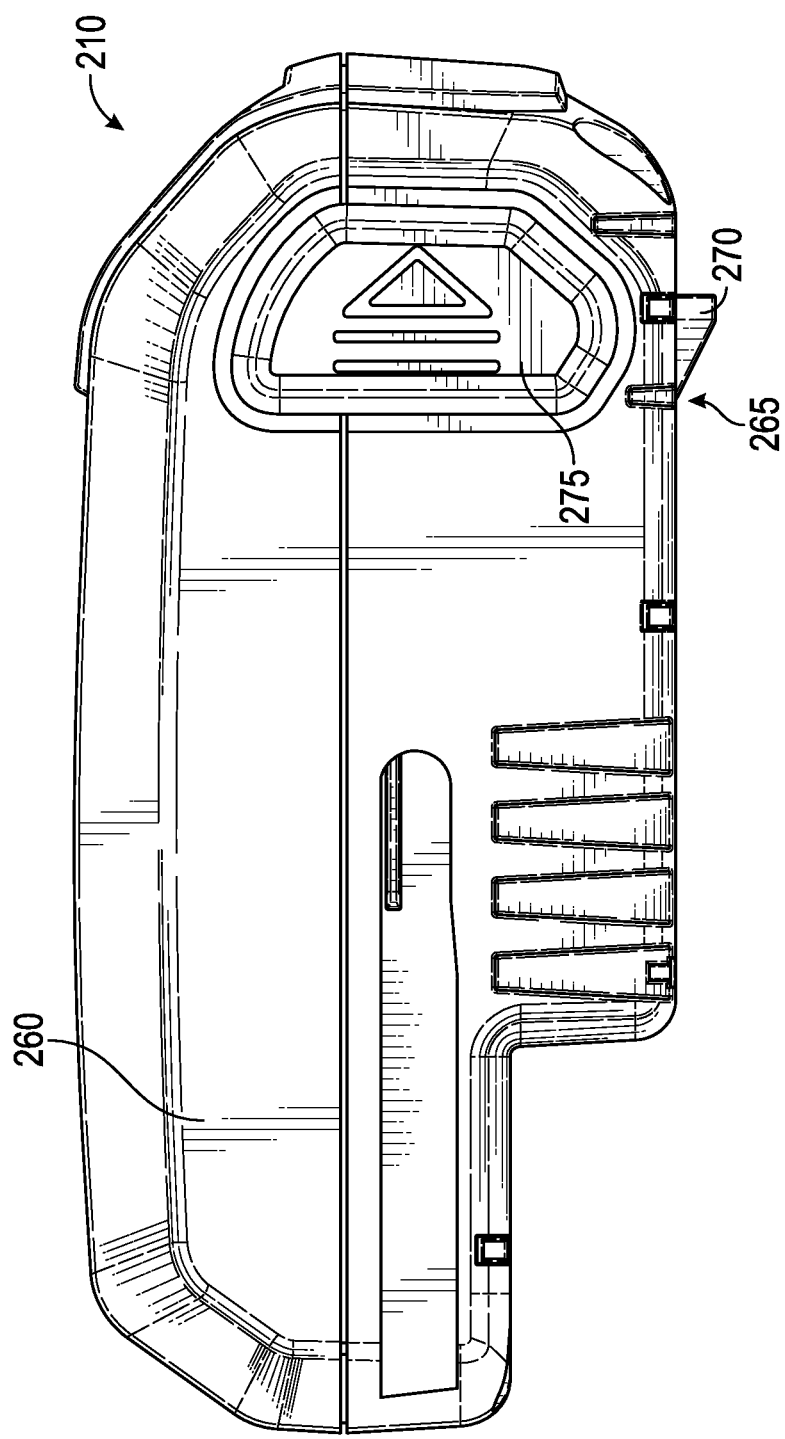
FIG. 9 is a side view of the battery of FIG. 2.
Figure 10:
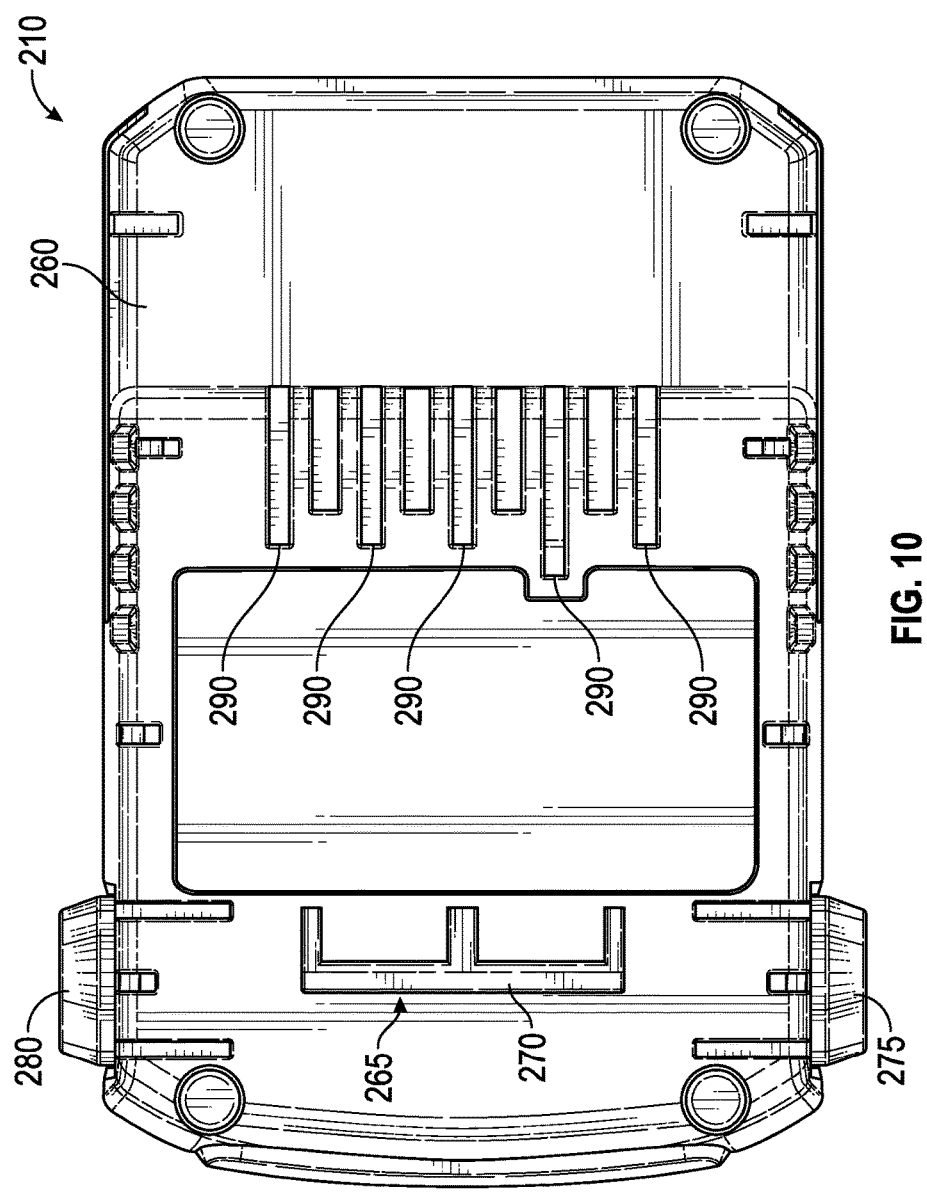
FIG. 10 is a bottom view of the battery of FIG. 2.

As shown in FIGS. 8-10, the battery 210 includes a locking mechanism 265 movable between an engaged position and a disengaged position. In the engaged position, the locking mechanism secures the battery 210 to battery receptacle 220, and in the disengaged position, the battery 210 is removable from the battery receptacle 220. The illustrated locking mechanism 265 includes a latch 270 and two user interfaces, buttons 275 and 280. The latch 270 is biased to the engaged (extended) position (e.g., by a spring). When the two buttons 275 and 280 are both actuated (e.g. depressed) by a user, the latch moves to the disengaged (retracted) position, allowing a user to remove the battery 210 from the battery receptacle 220 without the use of tools. Some embodiments of the locking mechanism may include a single user interface (e.g. button, slider, knob, etc.) or may include multiple latches. The latch 270 engages a corresponding feature in the battery receptacle 220 so that when the latch 270 is in the engaged position, the battery 210 is secured to the battery receptacle 220. The locking mechanism 265 can be actuated by the user by hand. This allows the removable rechargeable battery 210 to be attached to and removed from the base 205 without the use of tools. Alternatively, the locking mechanism 265 could be included in the battery receptacle 220 rather than the battery 210.

The battery 210 may include a display 285 for displaying battery information to a user. The display 285 is illustrated as a screen, but could also consist of one or more lights, LEDs, or other indicators. Battery information may be related to charge (e.g., amount of charge remaining, percentage of charge, number of starts remaining before need to recharge, etc.), error states (e.g., over temperature, under temperature, etc.), or other information about the battery potentially relevant to a user.

Referring to FIG. 10, the battery 210 also includes terminals 290 (e.g. positive terminal, negative terminal, auxiliary terminal, communication terminal, etc.) configured to electrically coupled to corresponding terminals in the battery receptacle 220 when the battery 210 is attached to the battery receptacle.

Figure 11:
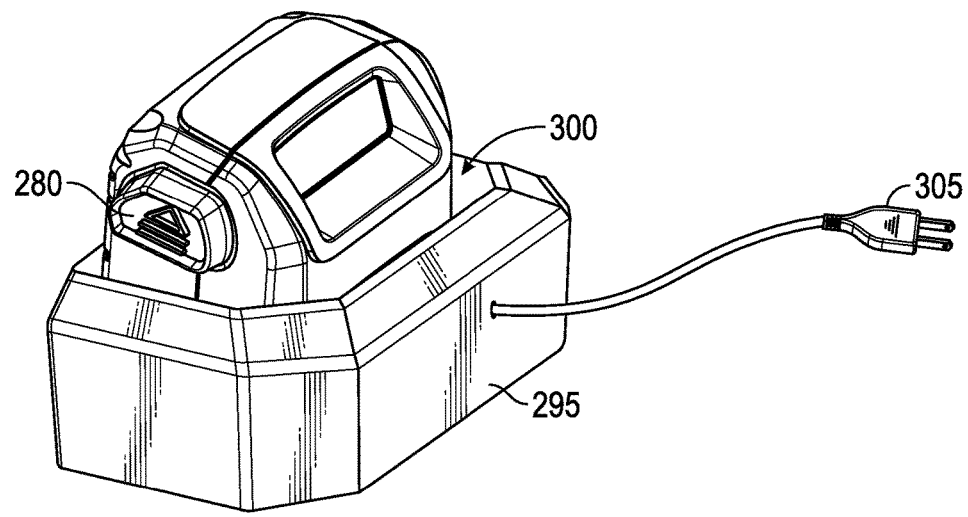
FIG. 11 is a perspective view of an exemplary embodiment of a charging station for charging the battery of FIG. 2.

Referring to FIG. 11, the battery 210 may also be received by and attached to a charging station 295 for recharging the battery 210. The charging station 295 includes a station battery receptacle 300 similar to the battery receptacle 220 of the base 205. The charging station 295 also includes an electrical plug 305 so that the charging station can be plugged into an outlet to recharge the battery.

Figure 12:
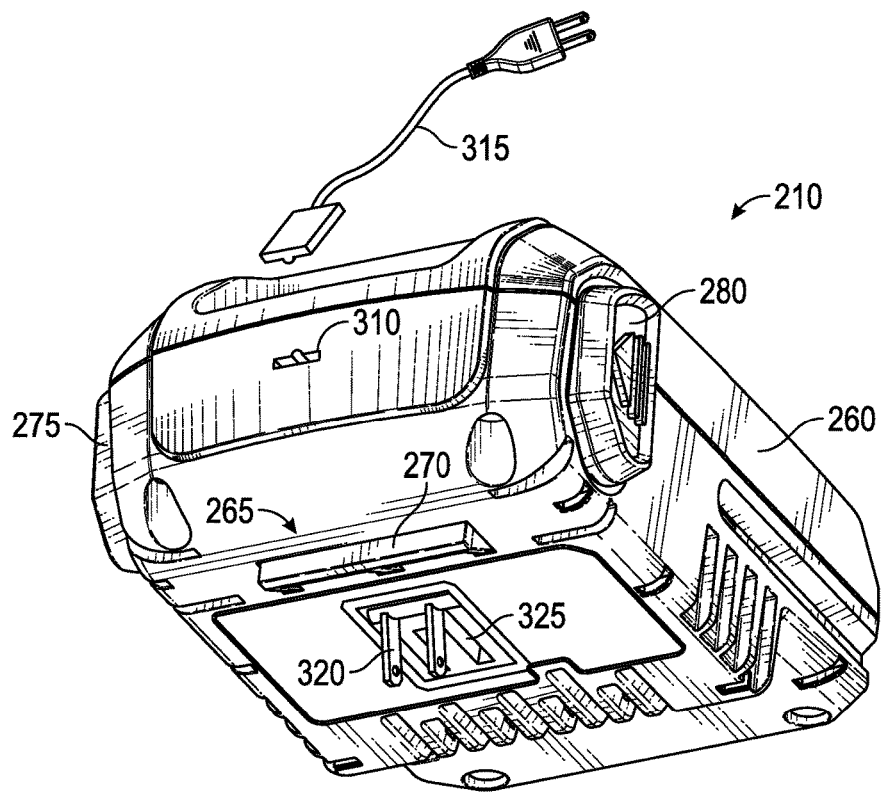
FIG. 12 is a perspective view from below of the battery of FIG. 2 including alternative charging structures.

Referring to FIG. 12, the battery 210 itself may include a port 310 to receive a charging cord 315. Once connected, the charging cord 315 can be plugged into an outlet to recharge the battery. The port 310 may also be used with an appropriate connection cord to power a device other than piece of equipment. For example, the port 310 may be a USB, micro-USB, or other standard electrical connection port and can be used to connect an appropriate connection cord to the battery 210 so that the battery 210 may power a cell phone, tablet, or other device. The battery 210 may include an electrical plug 320 to be plugged into an outlet to recharge the battery. In some embodiments, the plug 320 is fixed relative to the housing 260. In other embodiments, the plug 320 is movable between an extended (or use) position and a retracted (or storage) position. As illustrated in FIG. 12, the plug 320 has been rotated to the extended position and may be folded toward the housing 260 to a retracted position in which the plug 320 is located with a storage receptacle 325 so that the plug 320 is flush with or recessed relative to the portion of the housing 260 around the storage receptacle 325. The battery 210 includes circuitry to transform or condition the power as needed to charge the battery cells (e.g., to transform from AC to DC at the appropriate voltage and current and charging scheme).

Figure 13:
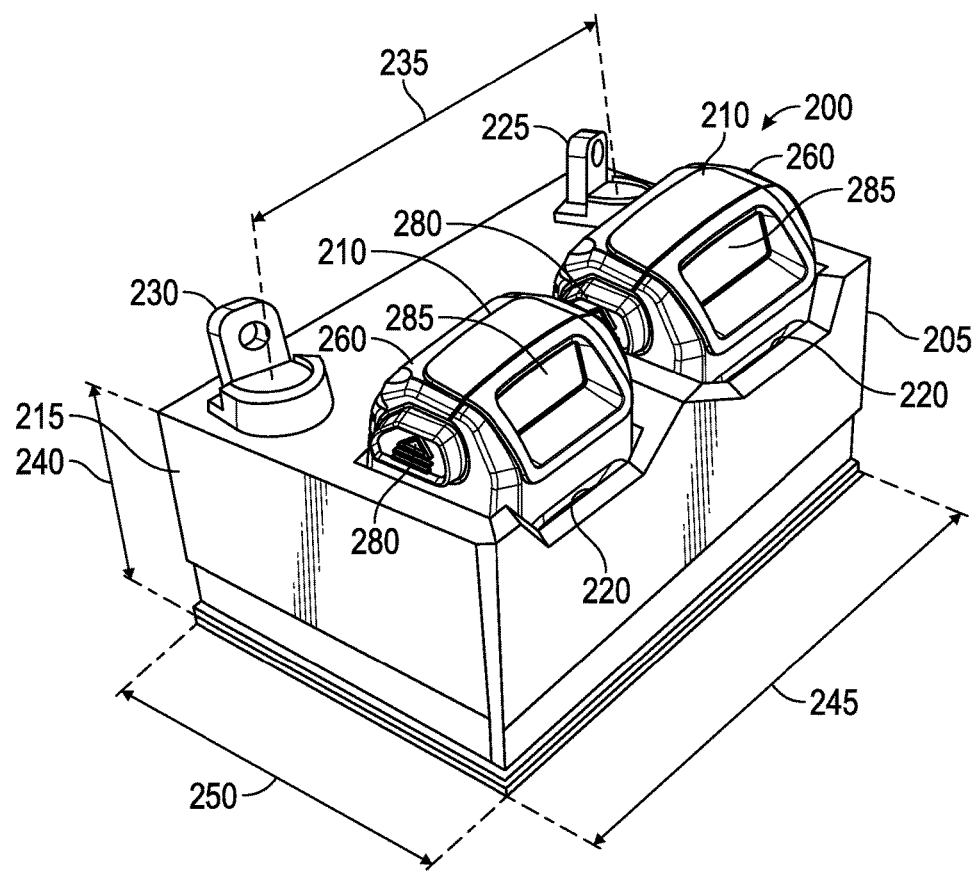
FIG. 13 is a perspective view of a battery system including a base and two rechargeable batteries, according to an exemplary embodiment.
Figure 14:
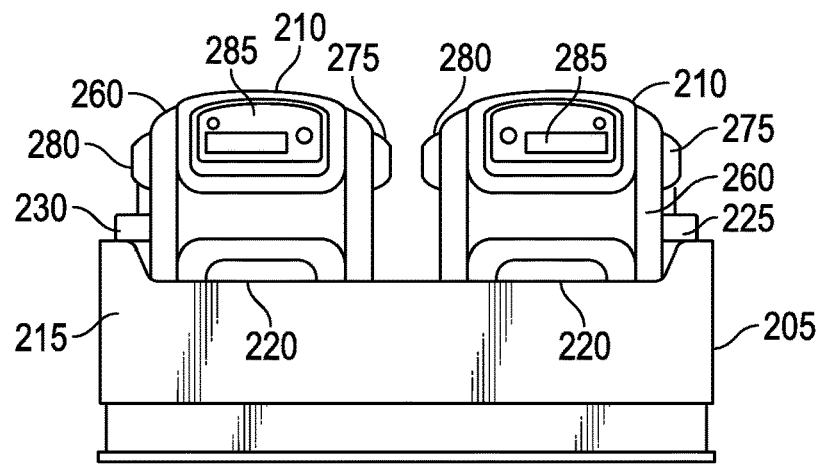
FIG. 14 is a front view of the battery system of FIG. 11.

An alternative embodiment of the battery system 200 is illustrated in FIGS. 13-14. In this embodiment, the base 205 includes two battery receptacles 220 that each receive and attach a removable rechargeable battery 210 to the base 205. The embodiment shown in FIGS. 13-14 may be used where a higher energy/capacity power supply may be needed. This may be to start a larger sized engine (e.g., an engine for a riding tractor) or for cold weather operation. In some embodiments, the rechargeable battery 210 is available in different versions that provide different power capacities (e.g., different batteries rated at 6 volts, 12 volts, 18 volts, etc.). The available power capacity of a battery system 200 could then be adjusted as needed based on the capacity of the rechargeable battery 210 or batteries 210 used with the base 205.

Figure 15:
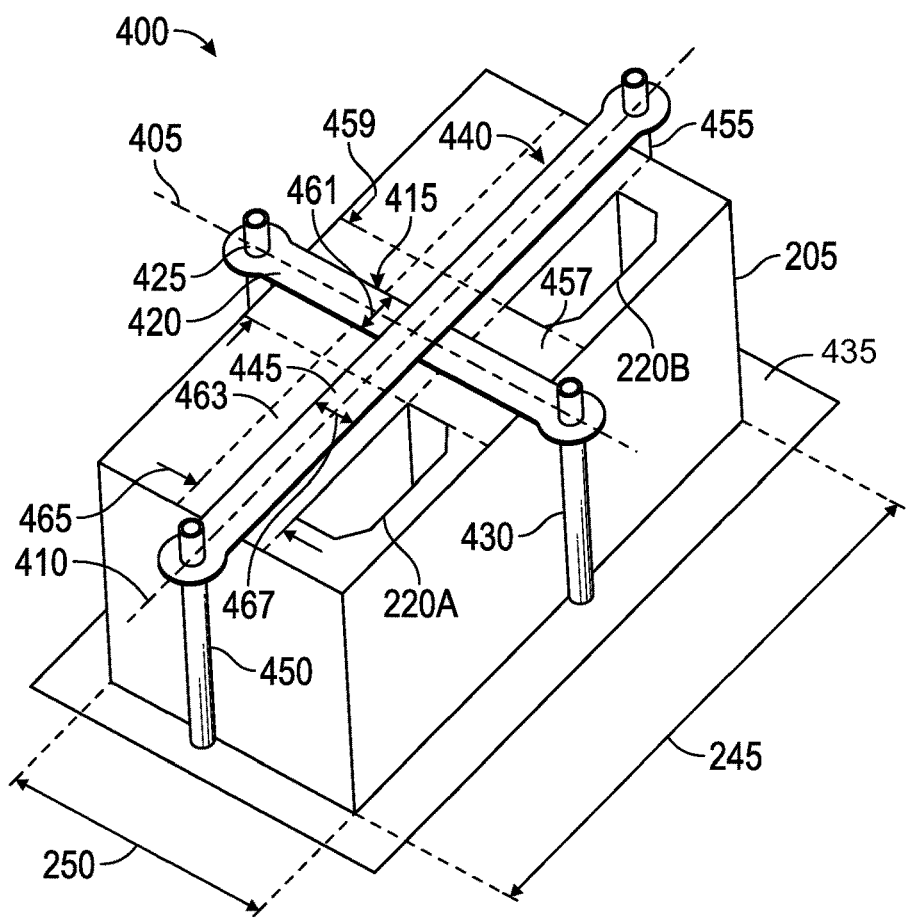
FIG. 15 is a perspective view of a battery system including a base and two rechargeable batteries, according to an exemplary embodiment.
Figure 16:
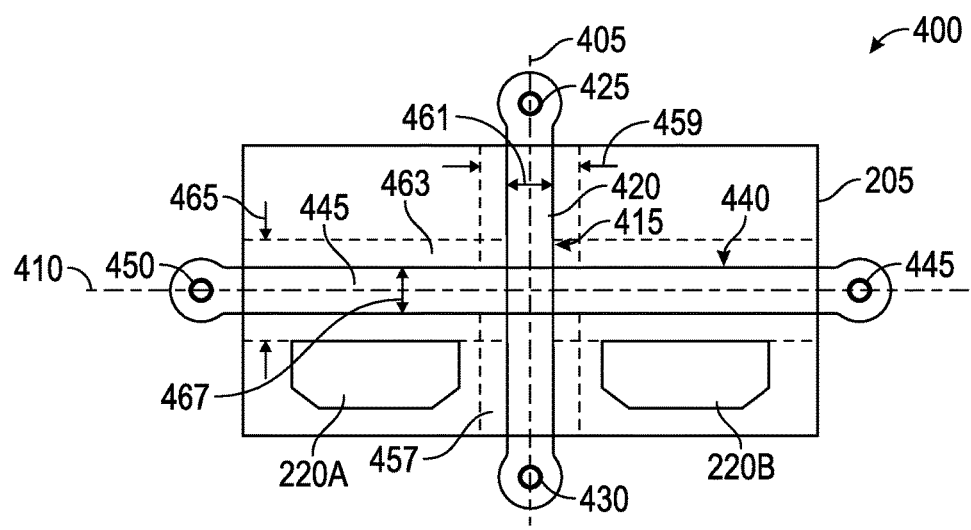
FIG. 16 is a top view of the battery system of FIG. 15.
Figure 17:
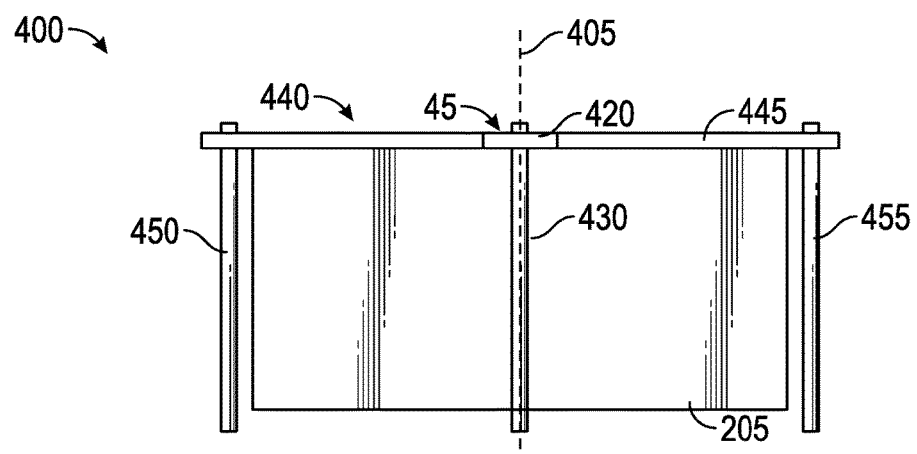
FIG. 17 is a front view of the battery system of FIG. 15.

The original standard lead-acid battery is frequently secured to the battery mounting location of the piece of equipment by a battery hold down as is known in the art. Typically, a battery hold down includes a top plate that extends across the top of the battery and two side supports that are secured to the top plate and a mounting plate located beneath the battery to clamp the battery in place. The top plate typically extends along the midpoint of the width of the battery or the midpoint of the depth of the battery. In some embodiments of the battery system (e.g., battery system 400 discussed below), a user is able to use the same battery hold down to secure the base to the battery mounting as used to secure the original standard lead-acid battery because the battery receptacle or receptacles are positioned within the base to accommodate the mounting location of one or more battery hold downs. A battery system 400 is illustrated in FIGS. 15-17 according to one such exemplary embodiment. System 400 is similar to the embodiment of battery system 200 illustrated in FIGS. 13-14, which includes multiple battery receptacles and multiple removable rechargeable batteries. However, the positioning of the battery receptacle to accommodate the mounting locations of one or more battery hold downs is also applicable to embodiments of the battery system that include one battery receptacle or more than two battery receptacles.

As illustrated in FIGS. 15-17, the battery system 400 includes two battery receptacles 220A and 220B. The midpoint of the width 245 of the base 205 is illustrated as center line 405 and the midpoint of the depth 250 is illustrated as center line 410. Two battery hold downs are illustrated, which could be used separately or in combination. Battery hold down 415 includes a top plate 420 and two side supports 425 and 430. The top plate 420 extends across the midpoint of the width 245 (line 405) and is secured to a mounting plate 435 by the side supports 425 and 430. Battery hold down 440 includes a top plate 445 and two side supports 450 and 455. The top plate 445 extends across the midpoint of the depth 250 (line 410) and is secured to the mounting plate 435 by the side supports 450 and 455. In various embodiments, the side supports may be directly secured to the top plate and mounting plate (e.g., by threads integral to the side supports and plates), indirectly secured to the top plate and mounting plate (e.g., by fasteners separate from the side supports and plates), secured a combination of integrated and separate fasteners (e.g., integrated threads on the side support secured by a separate nut to the top mounting plate).

Each of the battery receptacles 220A and 220B is positioned entirely on opposite sides of the midpoint of the width 245 (line 405). As illustrated, the midpoint of the width 245 (line 405) is located between the receptacles 220A and 220B. A mounting surface 457 extends across the midpoint of the width 245 (line 405) and has a width 459 extending between the two receptacles 220A and 220B that is greater than the width 461 of the top plate 420. This arrangement allows the top plate 420 to engage the mounting surface 457 without obstructing access to either of the receptacles 220A and 220B and so that no other portion of the hold down 415 obstructs access to either of the receptacles 220A and 220B. This unobstructed access allows a user to remove or insert both of the rechargeable batteries 210A and 210B without having to remove the hold down 415. This positioning also allows for the use of the same hold down used with the original standard lead-acid battery.

Each of the battery receptacles 220A and 220B is positioned entirely on one side of the midpoint of the depth 250 (line 410). Alternatively, one of the battery receptacles 220A and 220B is positioned entirely on one side of the midpoint of the depth 250 (line 410) and the other is positioned entirely on the other side of the midpoint of the depth 250 (line 410). As illustrated, the receptacles 220A and 220B are both located on the same side of the midpoint of the depth 250 (line 410). A mounting surface 463 extends across the midpoint of the depth 250 (line 410) and has a width 465 that is greater than the width 467 of the top plate 445. The mounting surface 463 is located so that the top plate 445 may engage the mounting surface 463 without obstructing access to either of the receptacles 220A and 220B. This positioning allows the hold down 440 to be used so that no portion of the hold down 440 obstructs access to either of the receptacles 220A and 220B. This unobstructed access allows a user to remove or insert both of the rechargeable batteries 210A and 210B without having to remove the hold down 440. This positioning also allows for the use of the same hold down used with the original standard lead-acid battery.

Figure 18:
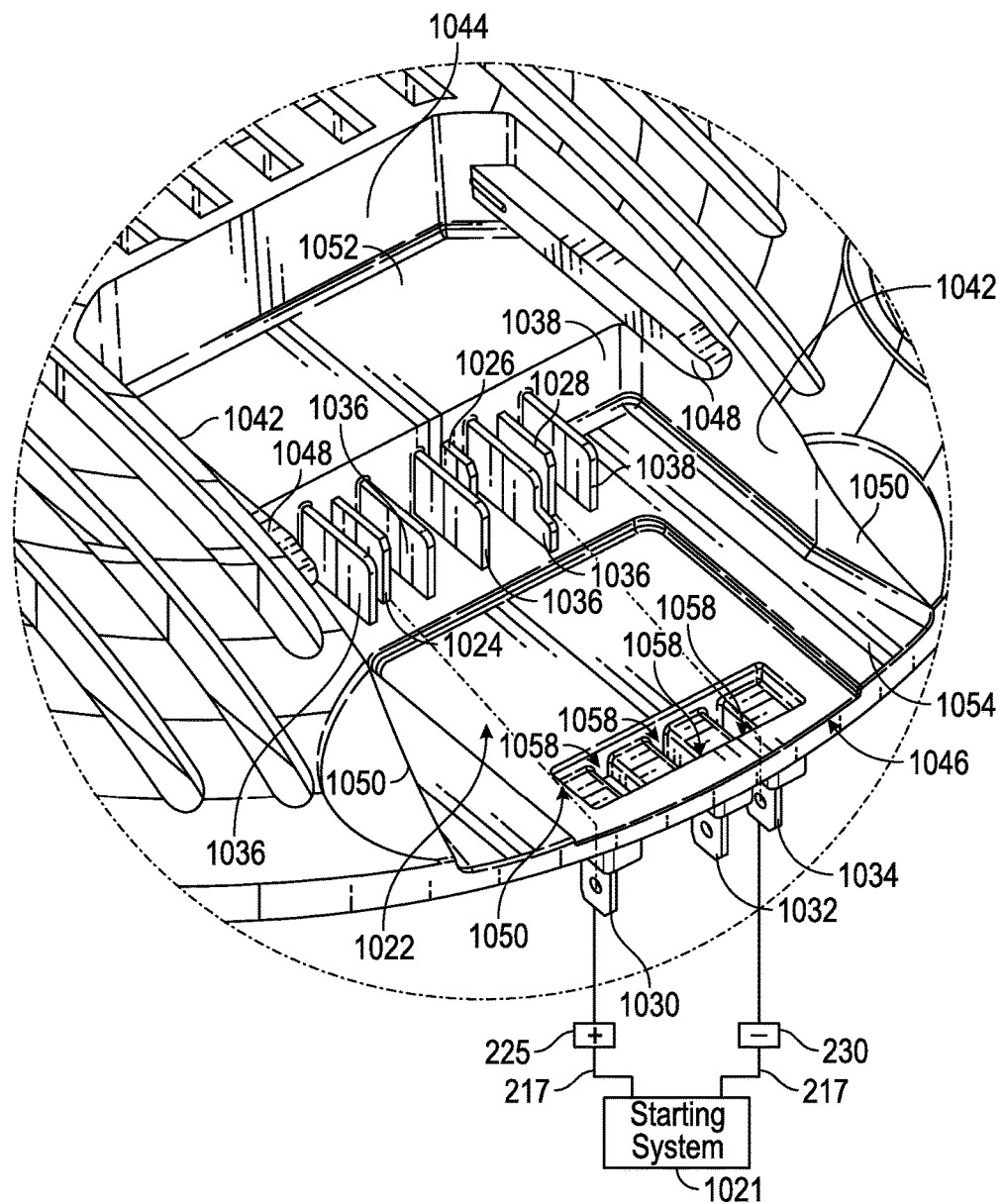
FIG. 18 is a perspective view of a battery receptacle according to an exemplary embodiment.
Figure 19:
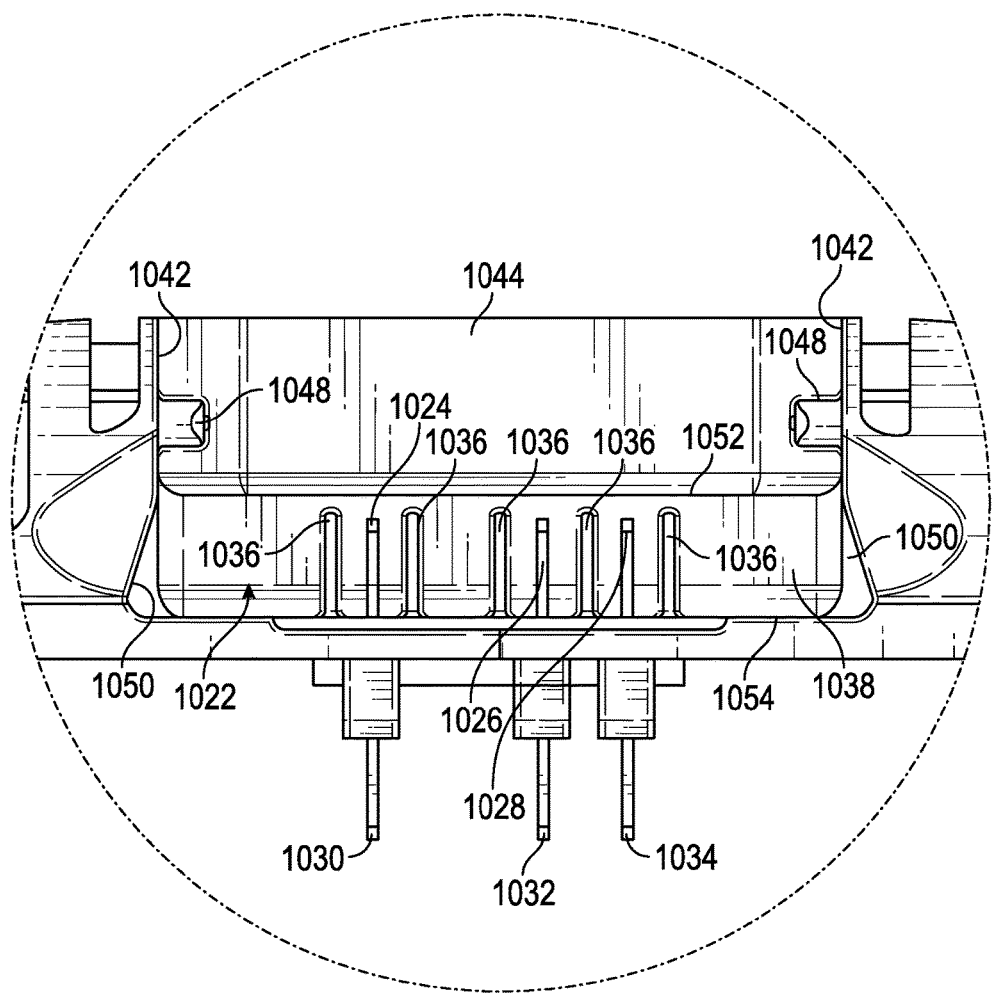
FIG. 19 is a front view of the battery receptacle of FIG. 18.

Referring to FIGS. 18-21, a removable rechargeable battery 1020 and a battery receptacle 1022 are illustrated according to an exemplary embodiment. Referring to FIGS. 18-19, the battery receptacle 1022 includes three male terminals 1024, 1026 and 1028 configured to couple with corresponding female terminals of the battery 1020. The receptacle 1022 includes a second set of three male terminals 1030, 1032, and 1034 for coupling to a system to be powered by the rechargeable battery 1020 (e.g., a starting system or other electrical system of an engine or a piece of equipment). The terminal 1024 is electrically coupled to the terminal 1030 and the terminal 1028 is electrically coupled to the terminal 1034 forming two terminal pairs (i.e. terminals 1024 and 1030 and terminals 1028 and 1034. The terminal 1030 is electrically coupled to the positive terminal 225 of the base 205 and the terminal 1034 is electrically coupled to the negative terminal 230 of the base 205. The positive terminal 225 and the negative terminal 230 of the base 205 are electrically coupled to a starting system 1021 of an internal combustion engine. When the removable rechargeable battery 1020 is connected to the battery receptacle 1022 an electrical circuit is created between the starting system 1021 and the battery 1020 so that battery 1020 may be used to power the starting system 1021. In some embodiments, the battery receptacle 1022 includes one or more additional terminal pairs (e.g., terminals 1026 and 1032) that may be used to transmit a signal (e.g., an enable signal or other data signals) to and/or from the battery 1020 so that communication, date, or other electronic signals can then be passed to or from the battery to appropriate systems or controllers for the engine or equipment associated with the battery system. A guide 1036 (wall, protrusion, etc.) is positioned on either side of each of the terminals 1024 and 1028. Each guide 1036 is received by a corresponding aperture in the lithium-ion battery and helps to guide the terminals 1024 and 1028 into the corresponding female terminals of the battery 1020. The guides 1036 extend outward from a wall 1038 of the receptacle 1022 to a distance greater than that of the terminals 1024 and 1028.

The receptacle 1022 is defined by a floor 1040, sidewalls 1042, and an end wall 1044. The receptacle 1022 is open on one end 1046 to allow the battery 1020 to be slid into the receptacle 1022 from the open end. The sidewalls 1042 are connected by the end wall 1044. A protrusion or rail 1048 extends inward from each sidewall 1042 and is sized to be received by a corresponding slot in the battery 1020. Each rail 1048 extends forward from the end wall 1044 toward the open end 1046.

The sidewalls 1042 may each include an angled end portion 1050 proximate the open end 1046 such that the open end 1046 has a width that is greater than the width of the battery 1020 and of the remainder of the receptacle 1022. The angled end portions 1050 facilitate the insertion of the battery 1020 into the receptacle 1022 through the open end 1046. The angled end portions 1050 also provide access for a user to actuate the push buttons found on the sides of the battery 1020.

The floor 1040 is an offset body that includes the wall 1038 (a vertical step or shoulder). The wall 1038 may contact a corresponding wall of the battery 1020 to limit the travel of the battery 1020. The wall 1038 separates two portions of the floor 1040, the upper portion 1052 and the lower portion 1054. The lower portion 1054 includes a latching region 1056 (strike plate, latching portion, locking region, locking portion) configured to receive a corresponding latch of the battery 1020 to secure the lithium-ion battery to the battery receiver 1018. The latching region 1056 includes apertures 1058 that each are configured to receive and correspond to a protrusion of the latch of the battery 1020.

In some embodiments, the receptacle 1022 is configured to protect the terminals 1024, 1026, and 1028 from environmental hazards. For example, the floor 1040 may slope away from the terminals 1024 and 1028 to direct moisture away from the terminals 1024 and 1028. According to other exemplary embodiments, the terminals may be oriented horizontally or the terminals of the battery may be vertical and interface with terminals provided in an elevated portion of the receiver such that any moisture that enters the space between the battery and the receiver flows away from the terminals.

Figure 20:
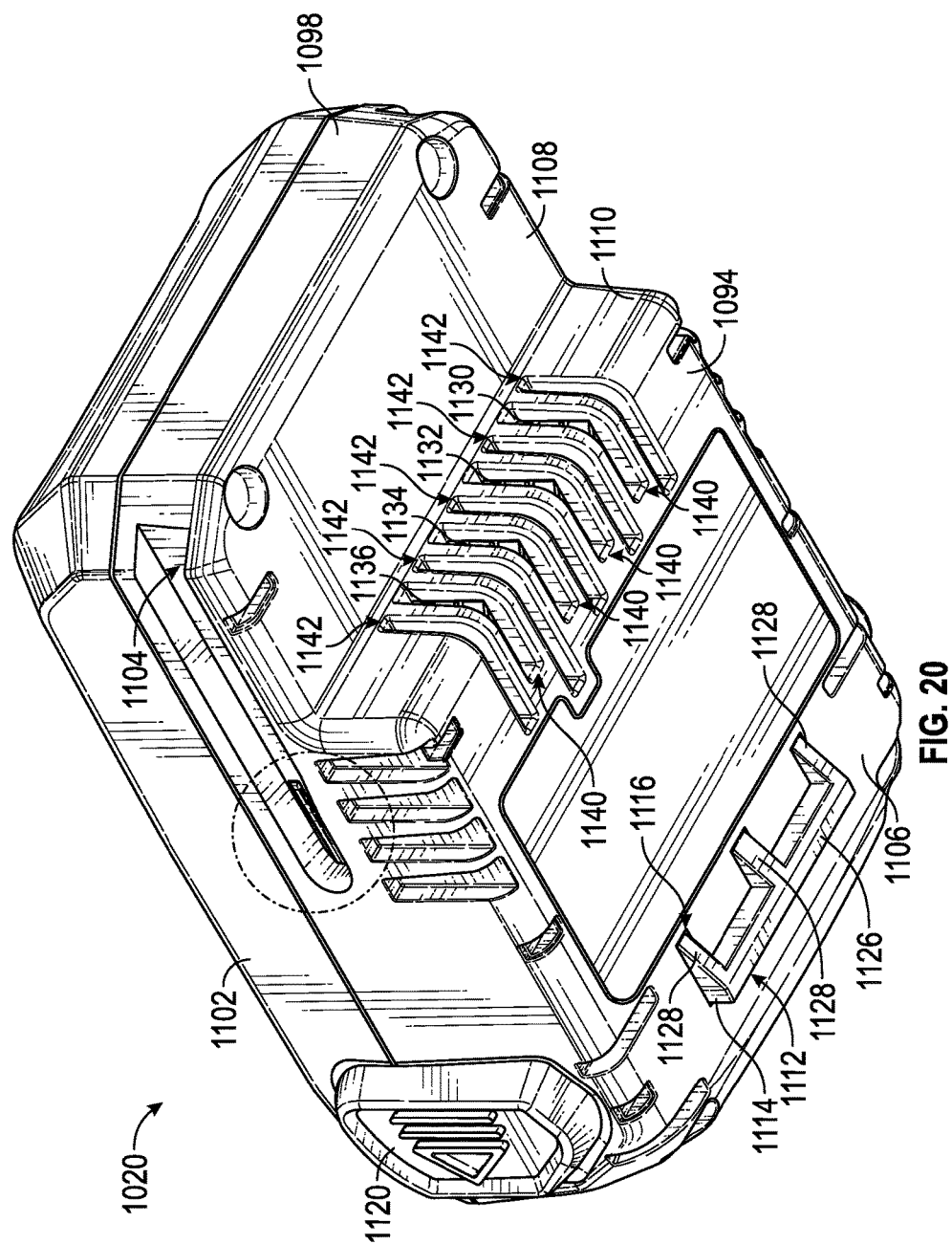
FIG. 20 is a perspective view from below of a battery for use with the battery receptacle of FIG. 18.

Referring to FIGS. 20-21, the removable rechargeable battery 1020 is illustrated according to an exemplary embodiment. A battery housing 1086 contains and supports the rechargeable battery cells. The housing 1086 also supports the display 1080 and the user interface 1084. The housing 1086 has a top side 1092, a bottom side 1094, a front side 1096, a back side 1098, a left side 1100, and a right side 1102. The overall dimensions of the housing 1086 correspond to those of the receptacle 1022 so that the battery 1020 can be received by the receptacle 1022 and attached to the base 205.

An aperture or slot 1104 is formed in the left side 1100 and the right side 1102 proximate the back side 1098. The slots 1104 include an open end at the back side 1098 and an opposite closed end. Each slot 1104 is sized to receive the corresponding rail 1048 of the receptacle 1022. Contact between the closed end of the slots 1104 and the corresponding ends of the rails 1048 functions as a stop to limit the travel of the battery 1020 into the receptacle 1022.

The bottom side 1094 of the housing 1086 is an offset body that mirrors the floor 1040 of the receptacle 1022. The bottom side 1094 includes an upper portion 1106 and a lower portion 1108 separated by a wall 1110. Contact between the wall 1110 of the battery 1020 and the corresponding wall 1038 of the receptacle 1022 functions as a stop to limit the travel of the battery 1020 into the receptacle 1022.

A latch 1112 (lock, locking member, latching member) is pivotally coupled to the housing 1086. As shown in FIG. 20, in a latched position (secured, locked, engaged, extended etc.), a latching portion 1114 of the latch 1112 extends through an aperture 1116 (opening) through the bottom side 1094 of the housing 1086 and is retracted through the aperture 1116 into the interior of the housing 1086 in a release position (unlatched, unsecured, unlocked, disengaged, retracted, etc.). The latch 1112 is mechanically coupled to a pair of push buttons, a right push button 1120 and a left push button 1122. Each push button extends through an aperture in a corresponding side of the housing. The push buttons 1120 and 1122 are biased outward from the interior of the housing 1086 to an extended position (secured, locked, engaged, latched, etc.) A spring or other biasing member or biasing members bias the push buttons 1120 and 1122 to the extended position. The push buttons 1120 and 1122 are movable inward toward the interior of the housing 1086 to a depressed position (retracted, released, unsecured, unlocked, disengaged, etc.). The mechanical coupling between the push buttons 1120 and 1122 is such that the push buttons being in the extended position causes the latch 1112 to be in the latched position and moving both push buttons 1120 and 1122 to the depressed position causes the latch 1112 to be in the release position. This mechanical coupling also causes the spring to bias the latch 1112 to the latched position. In some embodiments, the push buttons 1120 and 1122 are able to move separately from one another, but each push button 1120 and 1122 must be in its depressed position for the latch to completely be in the release position. This arrangement helps to avoid accidental unlatching (unsecuring, release, unlocking, etc.) of the battery 1020 from the receptacle 1022 when only one of the push buttons 1120 and 1122 is depressed. This helps to prevent the battery 1020 from unwanted unlatching when impacted by an object or obstacle (branch, trunk, wall, shrub, rock, etc.) when in use on a piece of outdoor power equipment because it is unlikely that both push buttons 1120 and 1120 will be simultaneously actuated by an unwanted impact with an object of obstacle when using the outdoor power equipment. The latching portion 1114 includes one or more protrusions, as illustrated a transverse wall 1126 and three legs 1128 that extend substantially perpendicular to the wall 1126.

Four female terminals 1130, 1132, 1134, and 1136 are located within the bottom side 1094 of the housing 1086. The female terminals 1130, 1132, 1134, and 1136 are configured to couple with the corresponding male terminals of a receptacle, for example male terminals 1024 and 1028 of the receptacle 1022 of the base 205 or male terminals of the receptacle of a charging station.

A pair of the terminals (e.g., terminals 1130 and 1134) are used to complete an electrical circuit between the starting system 2021 and the battery 1020 (e.g., as a positive terminal and a ground terminal). The other two terminals (e.g., terminals 1132 and 1136) may each be used to transmit a signal (e.g., an enable signal or other date signal) to and/or from the battery 1020. In a preferred embodiment, each of the female terminals 1130, 1132, 1134, and 1136 is formed as a pair of opposed springs that receive and hold a male terminal of the battery receptacle 1022. The opposed springs exert opposing forces transverse to the longitudinal axis of the male terminal, which helps to reduce wear of the male terminals and make a secure electrical connection between the female terminal and the male terminal.

The terminals 1130, 1132, 1134, and 1136 are positioned within slots or apertures 1140 formed in the bottom side 1094. Each aperture 1140 has an open end in the wall 1110 and an open end in the upper portion 1106 and is sized to receive a corresponding male terminal. Additional apertures 1142 are formed in the bottom side, each with an open end in the wall 1110 and an open end in the upper portion 1106.

Each aperture 1142 is sized and positioned to receive one of the guides 1036 of the receptacle 1022. The interaction between the apertures 1142 and the guides 1036 help to guide the battery 1020 into the receptacle 1022 and ensure proper connections between the male terminals of the receptacle 1022 and the female terminals of the battery 1020.

To attach the battery 1020 to the battery receiver 1018, the user slides the battery 1020 back side first into the receptacle 1022 through the open end 1046. The front end of each rail 1048 is received in the corresponding slot 1104 of the battery 1020, helping to guide the battery 1020 into the receptacle 1022 and to position the battery 1020 within the receptacle 1022. Each of the apertures 1142 of the battery 1020 then receive the corresponding guide 1036 of the receptacle, further helping to guide the battery 1020 into the receptacle and positioning the female terminals 1130 and 1134 of the battery 1020 to receive the male terminals 1024 and 1028 of the receptacle 1022. The voltage output terminals 1024 and 1130 and 1028 and 1134 are electrically connected. Contact between the wall 1038 of the receptacle 1022 and the wall 1110 of the lithium-ion battery and contact between the front ends of the rails 1048 of the receptacle 1022 and the closed ends of the slots 1104 of the battery 1020, and contact between the end wall 1044 of the receptacle 1022 and the back side 1098 of the battery 1020 stop (limit, halt) insertion of the battery 1020 into the receptacle 1022 and align the latch 1112 of the battery 1020 and the latching region 1056 of the receptacle 1022. When these points of physical contact between the battery 1020 and the receptacle are made, the battery 1020 is properly secured (fully inserted, fully seated, properly inserted, properly seated, properly installed) in the receptacle 1022. The latch 1112 is biased to latched position to automatically engage the latching region 1056, thereby attaching (securing, locking) the battery 1020 to the battery receiver 1018. In some embodiments, the latch 1112 engages the latching region 1056 with an audible sound (e.g., a "click"). With the latch 1112 in the latched position, the latching portion 1114 engages the latching region 1056 of the receptacle 1022 to attach the battery 1020 to the battery receiver 1018. In the latched position of the latch 1112, the wall 1126 and legs 1128 of the latching portion 1114 are received by corresponding apertures 1058 of the latching region 1056. In the release position of the latch 1112, the wall 1126 and the legs 1128 are moved out of the apertures 1058, unattaching (unsecuring, unlocking, releasing, disengaging) the battery 1020 from the battery receiver 1018 and allowing the battery 1020 to be removed from the receptacle 1022 by reversing the above steps. The latch 1112 is moved to the release position by moving each push button 1120 and 1122 to its depressed position. In this way, the battery 1020 is removably attached to the battery receiver 1018 and the push buttons 1120 and 1122 and latch 1112 allow a user to selectively attach and remove the battery 1020 to the battery receiver 1018 without the use of tools. In some embodiments, the battery receptacle 1022 includes female terminals and the battery 1020 includes male terminals.

In an alternative embodiment, the battery system includes a base and a rechargeable battery where the base and rechargeable battery are formed as an single integrated unit, rather than having the rechargeable battery be removable from the base. The rechargeable battery of such an integrated unit could be recharged via a port for connecting a charging cord (e.g., port 310) or recharged by a charging system (e.g., an alternator, an ignition coil waste spark charging system, etc.) of an internal combustion engine associated with the battery system. For example, an engine for powering a lawn tractor or other relatively large piece of equipment may include an alternator that could be used to recharge the rechargeable battery while the engine is running.

A user could replace an original standard lead-acid battery with the battery system according to the following exemplary method. Step 1 is disconnecting the electrical leads from the positive and negative terminals of the lead acid battery. Step 2 is removing one or more battery hold downs. Step 3 is removing the lead-acid battery from the battery mounting location. Step 4 is installing the base of the battery system at the battery mounting location. Step 5 is installing the one or more battery hold downs to secure the base to the battery mounting location. In some embodiments, the one or more battery hold downs are the same one or more battery hold downs previously used to secure the removed lead-acid battery. Step 6 is connecting the electrical leads to the positive and negative terminals of the base. In some embodiments, the electrical leads connected to the terminals of the base are the same electrical leads previously connected to the terminals of the removed lead-acid battery. Step 7 is inserting the removable rechargeable battery into the battery receptacle of the base. Step 8 is attaching one or more terminal covers to the base to limit access to the positive and negative terminals of the base. Step 9 is removing the removable rechargeable battery from the battery receptacle as needed to charge the rechargeable battery. Step 10 is reinserting the removable rechargeable battery into the battery receptacle of the base. In alternative embodiments, the order or sequence or these steps may be varied or re-sequenced or one or more of these steps may be omitted. For example, step 7 could occur before step 4 or before step 6.

Further embodiments of batteries and receiving ports suitable for use as the removable rechargeable battery and battery receptacle for a battery system as described in the present application are described in commonly-owned U.S. application Ser. No. 14/309,602, filed Jun. 19, 2014 and published as U.S. patent application publication no. 2014/0299089, U.S. application No. 61/837,539, filed Jun. 20, 2013, and U.S. application No. 61/892,346, filed Oct. 17, 2013, all of which are incorporated herein by reference in their entireties.

Alternatively, the battery system may be used as original equipment by an original equipment manufacturer ("OEM"). In this situation, the battery system would not be a one-for-one replacement of a standard lead-acid battery originally included with the piece of equipment, but would instead be a direct substitute for a lead-acid battery such that a lead-acid battery would not be originally installed on the piece of equipment. Using the battery system as original equipment may reduce warranty and other costs related to lead-acid batteries. Frequently, seasonal use outdoor power equipment may sit in a store or warehouse for an extended period of time. That time reduces the useful life of the lead-acid battery available to the user. For example, if a lead-acid battery has an expected life of two years and the lead-acid battery for the piece of equipment is unused for a year because of shipping time, time spent in a warehouse or store, etc., the user may be left with only one year of actual useful life of the lead-acid battery. If the battery system is installed as original equipment by an OEM, the potential user frustration of unexpectedly shorted battery life may be avoided because of the ease of recharging the removable rechargeable battery of the battery system.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure. In alternative embodiments, the battery systems could be sized for automotive applications (such as passenger cars, trucks, etc.).

What is claimed is:

1. A battery system for use with outdoor power equipment, comprising:
    a base including a positive terminal, a negative terminal, and a battery receptacle electrically coupled to the positive terminal and the negative terminal, wherein the positive terminal and the negative terminal are spaced apart by a distance substantially the same as a standard distance between terminals of a standard lead-acid battery; and
    a lithium-ion battery comprising a battery housing, a positive battery terminal, a negative battery terminal, and at least one lithium-ion battery cell positioned within the battery housing, the battery housing configured to be received by the battery receptacle to removably attach the lithium-ion battery to the battery receptacle, wherein when attached, the positive battery terminal is electrically coupled to the positive terminal of the base and the negative battery terminal is electrically coupled to the negative terminal of the base via the battery receptacle;
    wherein the lithium-ion battery is removable from the base without the use of tools.

2. The battery system of claim 1, wherein the base comprises a housing having a maximum horizontal cross-sectional area substantially the same as or less than a standard cross-sectional area of a standard lead-acid battery.

3. The battery system of claim 1, wherein the positive terminal and the negative terminal are positioned at a height substantially the same as a standard height of terminals of a standard lead-acid battery.

4. The battery system of claim 1, further comprising:
    a charging station for recharging the lithium-ion battery, the charging station including a station battery receptacle and an electrical plug, wherein the lithium-ion battery is configured to be removably attached to the station battery receptacle, wherein when attached, the lithium-ion battery is electrically coupled to the electrical plug.

5. The battery system of claim 1, wherein the lithium-ion battery includes an electrical plug for supplying power to charge the lithium-ion battery.

6. The battery system of claim 1, wherein the battery receptacle comprises one of a plurality of battery receptacles and each battery receptacle is electrically coupled to the positive terminal and the negative terminal; and
    wherein the lithium-ion battery comprises one of a plurality of lithium-ion batteries and each lithium-ion battery is removably attached to one of the battery receptacles, wherein when attached to one of the battery receptacles, each lithium-ion battery is electrically coupled to the positive terminal and the negative terminal.

7. The battery system of claim 6, wherein the plurality of battery receptacles comprises a first battery receptacle and a second battery receptacle;
wherein the base has a width; and
wherein the two battery receptacles are positioned so that the midpoint of the width is located between the first battery receptacle and the second battery receptacle.

8. The battery system of claim 6, wherein the plurality of battery receptacles comprise a first battery receptacle and a second battery receptacle;
wherein the base has a depth; and
wherein each of the two battery receptacles is located entirely on one side of the midpoint of the depth.

9. The battery system of claim 1, wherein the battery receptacle is configured so that the lithium-ion battery is inserted into the battery receptacle in a substantially vertical direction and the lithium-ion battery is removed from the battery receptacle in a substantially vertical direction.

10. The battery system of claim 1, wherein the base has a width; and
wherein the receptacle is located entirely on one side of the midpoint of the width.

11. The battery system of claim 1, wherein the base has a depth; and
wherein the receptacle is located entirely on one side of the midpoint of the depth.

12. The battery system of claim 1, wherein the positive terminal and the negative terminal are positioned so that the same electrical leads used to electrically connect the positive terminal and the negative terminal of the standard lead-acid battery to a piece of equipment are also used to electrically connect the positive terminal and the negative terminal of the base to the piece of equipment.

13. The battery system of claim 1, further comprising:
a cover for limiting user access to at least one of the positive terminal and the negative terminal.

14. The battery system of claim 1, wherein the volume of the lithium-ion battery is less than the volume of the base.

15. A battery system, comprising:
a base including a positive base terminal, a negative base terminal, and a receptacle including a positive receptacle terminal electrically coupled to the positive base terminal and a negative receptacle terminal electrically coupled to the negative base terminal, wherein the base is configured to replace a standard lead-acid battery; and
a rechargeable battery including a housing, at least one rechargeable battery cell positioned within the housing, a positive battery terminal and a negative battery terminal, wherein the housing is configured to be received by the receptacle to removably attach the rechargeable battery to the receptacle of the base, wherein when attached, the positive battery terminal is electrically coupled to the positive receptacle terminal and the negative battery terminal is electrically coupled to the negative receptacle terminal so that the rechargeable battery is electrically coupled to the positive base terminal and the negative base terminal;
wherein the rechargeable battery is removable from the base without the use of tools.

16. The battery system of claim 15, wherein the base is configured to replace a standard lead-acid battery having a form factor selected from the group consisting of U1, U1R, 22F, 22NF, 26, and 26R.

17. The battery system of claim 15, wherein the base has a maximum height of 7¼ inches, a maximum width of 7¾ inches, and a maximum depth of 5⅛ inches.

18. The battery system of claim 15, wherein the positive terminal and the negative terminal comprise standard lead-acid battery terminals.

19. The battery system of claim 18, wherein the standard lead-acid battery terminals comprise one of L terminals, SAE terminals, JIS terminals, embedded low profile terminals, embedded high profile terminals, embedded automotive post terminals, automotive post and stud terminals, universal terminals, embedded universal terminals, automotive post terminals, wingnut terminals, dual wingnut terminals, stud terminals, low profile terminals, embedded automotive post and stud terminals, M terminals, and F terminals.

* * * * *